(12) United States Patent
Rizzardini et al.

(10) Patent No.: US 12,007,237 B2
(45) Date of Patent: *Jun. 11, 2024

(54) ELECTRONIC APPARATUS CONTROL METHOD PERFORMED THROUGH LID ANGLE CALCULATION, ELECTRONIC APPARATUS THEREOF AND SOFTWARE PRODUCT

(71) Applicant: STMICROELECTRONICS S.r.l., Agrate Brianza (IT)

(72) Inventors: Federico Rizzardini, Settimo Milanese (IT); Stefano Paolo Rivolta, Desio (IT); Lorenzo Bracco, Chivasso (IT); Marco Bianco, Cesano Boscone (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,296

(22) Filed: Apr. 13, 2023

(65) Prior Publication Data

US 2023/0251078 A1 Aug. 10, 2023

Related U.S. Application Data

(63) Continuation of application No. 17/237,844, filed on Apr. 22, 2021, now Pat. No. 11,656,071.

(30) Foreign Application Priority Data

May 5, 2020 (IT) ........................ 102020000009937

(51) Int. Cl.
*G01B 7/30* (2006.01)
*G01D 5/16* (2006.01)
(Continued)

(52) U.S. Cl.
CPC ................. *G01B 7/30* (2013.01); *G01D 5/16* (2013.01); *G01D 18/00* (2013.01); *G05B 17/02* (2013.01); *G06F 1/1616* (2013.01)

(58) Field of Classification Search
CPC . G01B 7/30; G01D 5/16; G01D 18/00; G05B 17/02; G06F 1/1616; G06F 1/1677; G06F 1/1694
See application file for complete search history.

(56) References Cited

U.S. PATENT DOCUMENTS 5,704,435 A 1/1998 Meyer et al.
9,160,261 B2 10/2015 Nishikimi
(Continued)

FOREIGN PATENT DOCUMENTS

CN 201493816 U 6/2010
CN 101788850 A 7/2010
(Continued)

*Primary Examiner* — Chad G Erdman
(74) *Attorney, Agent, or Firm* — Seed IP Law Group LLP

(57) ABSTRACT

A method is provided for controlling an electronic apparatus on the basis of a value of a lid angle between a first hardware element accommodating a first magnetometer and a second hardware element accommodating a second magnetometer. The method includes acquiring, through the magnetometers, first signals representing an orientation of the hardware elements. A calibration parameter indicative of a condition of calibration of the magnetometers is generated on the basis of the first signals. A reliability value indicative of a condition of reliability of the first signals is generated on the basis of the first signals. A first intermediate value of the lid angle is calculated on the basis of the first signals. A current value of the lid angle is calculated on the basis of the calibration parameter, of the reliability value, and of the first intermediate value, and the electronic apparatus is controlled on the basis of the current value.

20 Claims, 11 Drawing Sheets

(51) Int. Cl.
  *G01D 18/00* (2006.01)
  *G05B 17/02* (2006.01)
  *G06F 1/16* (2006.01)

(56) References Cited

U.S. PATENT DOCUMENTS

| | | | |
|---|---|---|---|
| 9,612,625 | B2 | 4/2017 | Oliver et al. |
| 9,707,043 | B2 | 7/2017 | Bozung |
| 9,897,465 | B2 | 2/2018 | DiFonzo et al. |
| 10,054,444 | B2 | 8/2018 | Czompo et al. |
| 10,062,362 | B2 | 8/2018 | Kwak et al. |
| 10,114,464 | B2 | 10/2018 | Micali et al. |
| 10,198,086 | B2 | 2/2019 | Parazynski et al. |
| 10,238,510 | B2 | 3/2019 | van der Walt et al. |
| 10,386,203 | B1 | 8/2019 | Zheng |
| 10,509,466 | B1 | 12/2019 | Miller et al. |
| 10,558,277 | B2 | 2/2020 | Henell |
| 10,976,150 | B2 | 4/2021 | Zancanato et al. |
| 2003/0203747 | A1 | 10/2003 | Nagamine |
| 2005/0103135 | A1 | 5/2005 | Forster et al. |
| 2008/0255795 | A1 | 10/2008 | Shkolnikov |
| 2009/0259424 | A1 | 10/2009 | Dutta et al. |
| 2012/0259578 | A1 | 10/2012 | Bevilacqua et al. |
| 2013/0269961 | A1 | 10/2013 | Lim et al. |
| 2014/0116133 | A1 | 5/2014 | Sheynblat et al. |
| 2015/0116362 | A1 | 4/2015 | Aurongzeb et al. |
| 2015/0130725 | A1 | 5/2015 | Knepper et al. |
| 2015/0177272 | A1 | 6/2015 | Clark |
| 2016/0147266 | A1 | 5/2016 | Chng et al. |
| 2016/0274722 | A1* | 9/2016 | Putzolu ............... G06F 3/0416 |
| 2017/0003751 | A1 | 1/2017 | Micali et al. |
| 2017/0010657 | A1 | 1/2017 | Schneider |
| 2017/0235355 | A1 | 8/2017 | Alshinnawi et al. |
| 2017/0258532 | A1 | 9/2017 | Shalayev et al. |
| 2017/0288295 | A1* | 10/2017 | Sultenfuss ............ H01Q 21/00 |
| 2017/0299388 | A9 | 10/2017 | Karahan et al. |
| 2018/0340768 | A1 | 11/2018 | Zancanato et al. |
| 2019/0009398 | A1 | 1/2019 | Zhong et al. |
| 2019/0094264 | A1* | 3/2019 | Zheng ............... G01C 21/1654 |
| 2019/0126456 | A1 | 5/2019 | Abbott et al. |
| 2020/0233537 | A1 | 7/2020 | Hong et al. |
| 2020/0340794 | A1* | 10/2020 | Park ........................ G01B 7/30 |
| 2021/0154820 | A1 | 5/2021 | Bianco et al. |
| 2021/0207940 | A1 | 7/2021 | Zancanato et al. |
| 2021/0348911 | A1 | 11/2021 | Rizzardini et al. |

FOREIGN PATENT DOCUMENTS

| | | | | |
|---|---|---|---|---|
| CN | 103678184 | A | | 3/2014 |
| CN | 104461330 | A | | 3/2015 |
| CN | 104718561 | A | * | 6/2015 ............... G06T 7/73 |
| CN | 104718561 | A | | 6/2015 |
| CN | 105405692 | A | | 3/2016 |
| CN | 105424040 | A | | 3/2016 |
| CN | 205289837 | U | | 6/2016 |
| CN | 105983949 | A | | 10/2016 |
| CN | 106482734 | A | | 3/2017 |
| CN | 108762324 | A | | 11/2018 |
| CN | 114035345 | A | | 2/2022 |
| EP | 0823720 | A1 | | 2/1998 |
| EP | 2151734 | A2 | | 2/2010 |
| EP | 2930467 | A1 | | 10/2015 |
| EP | 3065031 | A1 | | 9/2016 |
| EP | 3407157 | A1 | | 11/2018 |
| EP | 3862841 | A1 | | 8/2021 |
| JP | 2001113475 | A | | 4/2001 |
| JP | 2013066944 | A | | 4/2013 |
| WO | WO 2019150657 | A1 | | 8/2019 |
| WO | WO 2019168735 | A1 | | 9/2019 |
| WO | WO 2021128245 | A1 | | 7/2021 |

\* cited by examiner

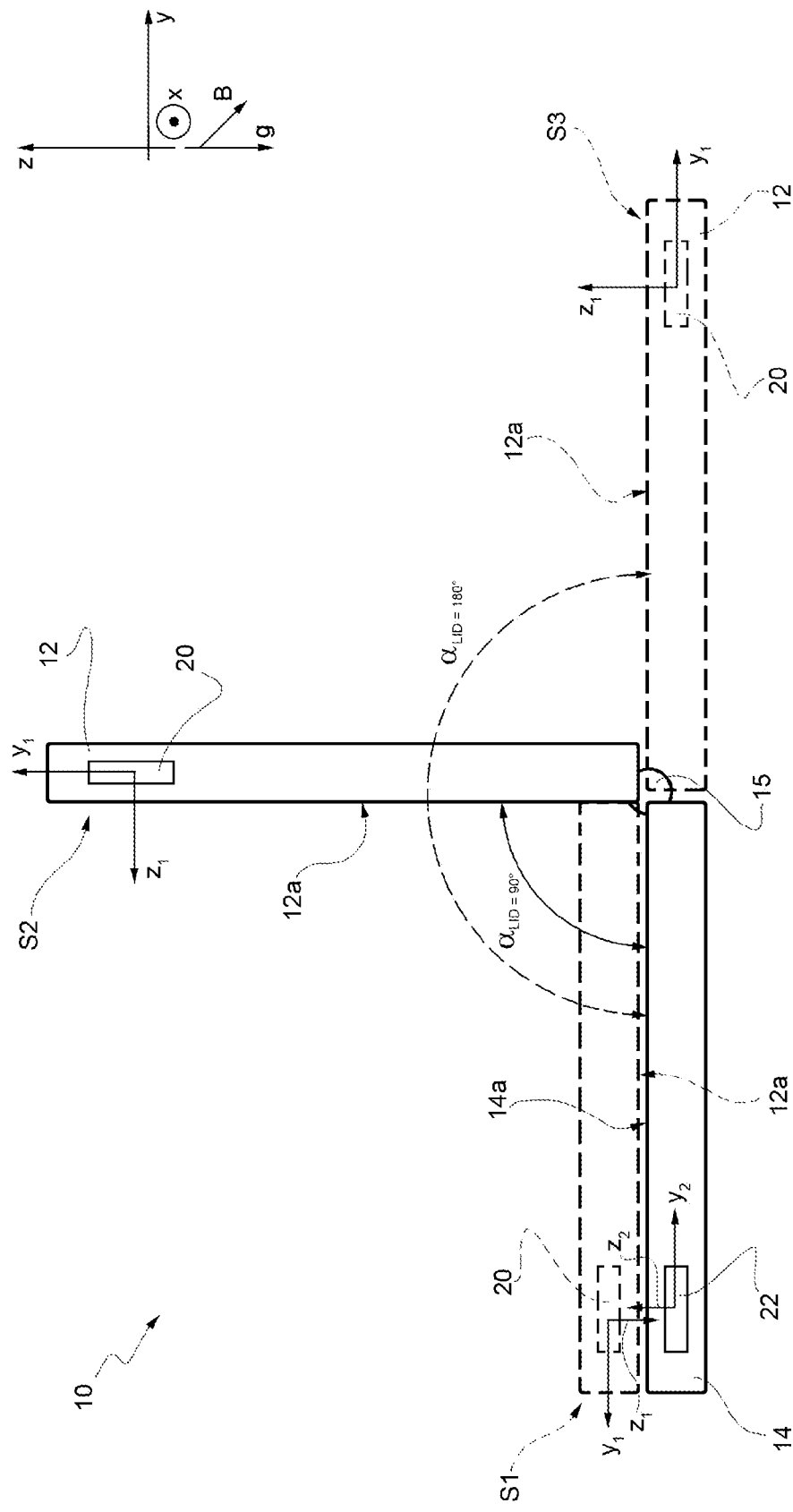

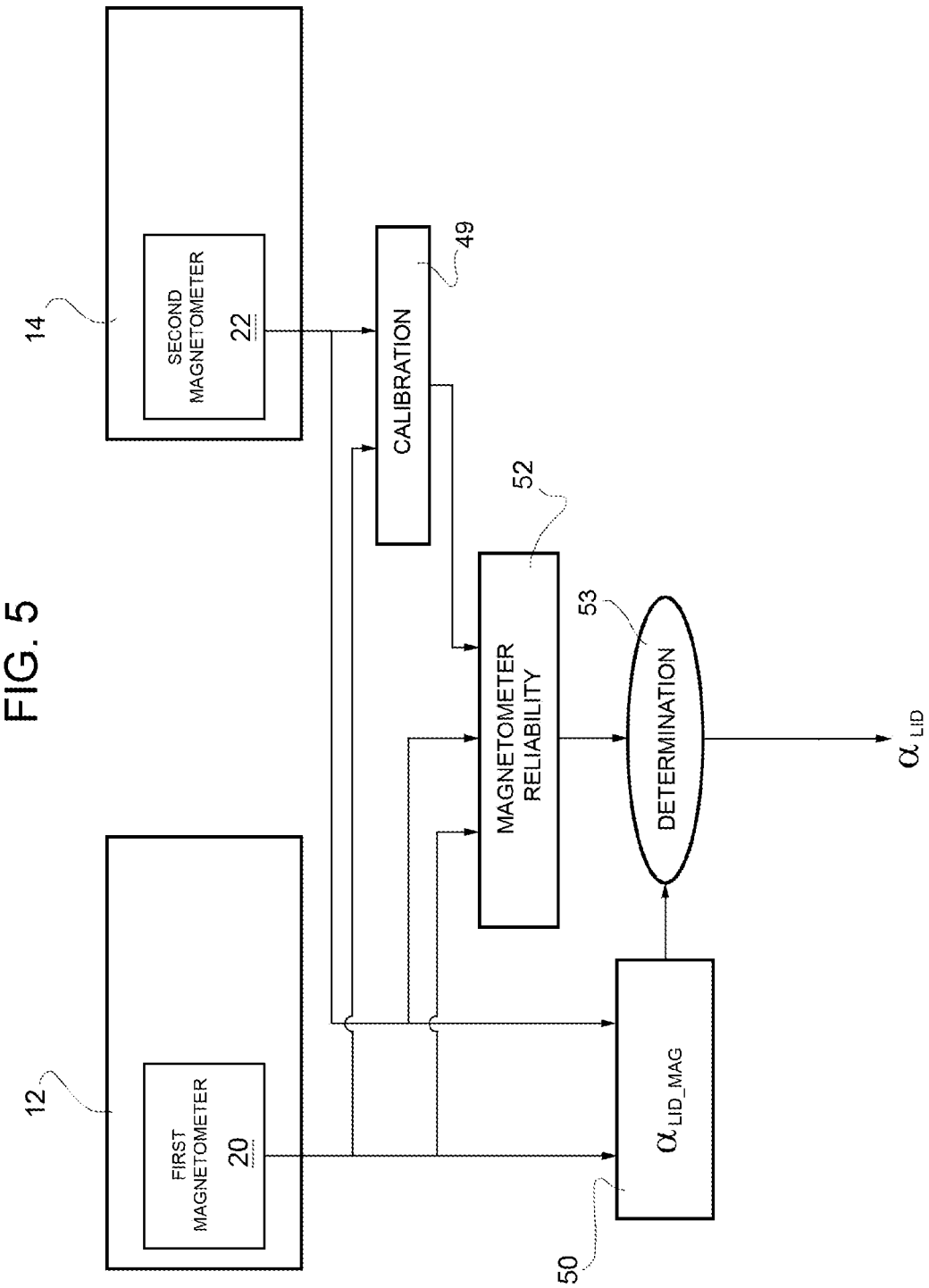

ELECTRONIC APPARATUS CONTROL METHOD PERFORMED THROUGH LID ANGLE CALCULATION, ELECTRONIC APPARATUS THEREOF AND SOFTWARE PRODUCT

BACKGROUND

Technical Field

The present disclosure relates to an electronic apparatus control method performed via calculation of an angle of lid opening, to an electronic apparatus thereof and to a software product.

Description of the Related Art

As illustrated in FIG. 1, a portable device 1 of a known type (e.g., a notebook) is typically formed by two functional blocks 2, 4, where the functional block 2 accommodates a screen 2a and the functional block 4 accommodates a keypad 4a and the control unit and memory 4b, 4c. The functional blocks 2 and 4 are coupled together by a pivot 6, configured for enabling a rotary movement of the functional block 2 with respect to the functional block 4. An angle $\alpha_{LID}$, known as opening angle or by the term "lid angle", is formed between the functional block 2 (i.e., at the screen 2a) and the functional block 4 (i.e., at the keypad 4a). For instance, the angle αLID is formed between respective surfaces of the functional block 2 and of the functional block 4. By convention, the angle $\alpha_{LID}$ is equal to 0° when the surface of the functional block 4 is parallel to and directly facing the surface of the functional block 2; and is equal to 360° when the surface of the functional block 4 is parallel to the surface of the functional block 2 but oriented in the opposite direction.

The measurement of the angle $\alpha_{LID}$ enables, for example, adaptation or modification of a user interface displayed by the screen 2a in order to improve user experience of the portable device 1.

Moreover, it is desirable to measure the angle αLID in portable devices such as tablets, foldable smartphones, and portable devices to which external keypads are operatively coupled (for example, integrated in a cover of the portable device and connected to the portable device by means of a wireless connection) in order to adapt or personalize the user interface or the configuration of the portable device and make available new possibilities of use thereof.

Known solutions for detecting the angle $\alpha_{LID}$ envisage the use of an accelerometer mounted on the functional block 2 and of an accelerometer mounted on the functional block 4. Said accelerometers supply data indicating the direction of the force of gravity with respect to respective systems of co-ordinates centered on the accelerometers themselves, thus making it possible to identify a position of the functional block 2 with respect to the functional block 4. However, this solution, being based exclusively upon the information deriving from the force gravity, does not make it possible to provide indications useful for all the possible orientations and arrangements in space of the portable device 1. In fact, this solution does not enable a reliable measurement if the portable device 1 is oriented with the pivot 6 parallel to the direction of the force of gravity (i.e., vertical position, or book-like position, of the portable device 1). Furthermore, the accelerometers are subject to environmental vibrational stimuli that may cause the measurement to be imprecise or wrong. In particular, given that accelerometers are sensitive to linear accelerations, the measurement of the angle $\alpha_{LID}$ is unreliable when the portable device is moving or else is subjected to external vibrations, for example when a person who is carrying the portable device is walking or is travelling in a means of transport. It is possible to use a filter (e.g., a lowpass filter) for reducing the effect of the linear accelerations on the measurement of the angle $\alpha_{LID}$, but this increases the response time in estimation of the angle $\alpha_{LID}$.

The patent document EP3407157 discloses a portable device analogous to the one illustrated in FIG. 1, where each functional block further includes a respective gyroscope. Gyroscopes are used in order to improve the reactivity of the measurement of the angle $\alpha_{LID}$ and to enable, through a data-fusion approach, said measurement to be made even when the portable device is rotated in the vertical position.

BRIEF SUMMARY

In various embodiments, the present disclosure provides an electronic apparatus control method performed through lid angle calculation, an electronic apparatus thereof and a software product that overcome the drawbacks of the prior art.

According to the present disclosure an electronic apparatus control method performed through lid angle calculation, an electronic apparatus thereof and a software product are provided.

In at least one embodiment, a method is provided for controlling at least one function of an electronic apparatus as a function of a value of a lid angle between a first hardware element and a second hardware element of the electronic apparatus. The first hardware element accommodates a first magnetometer and the second hardware element accommodates a second magnetometer and is orientable with respect to the first hardware element. The method includes: generating, by the first magnetometer and by the second magnetometer, first signals that are indicative of measurements of a magnetic field external to the electronic apparatus and are indicative of a relative orientation of the first hardware element with respect to the second hardware element; acquiring, by a processing unit of the electronic apparatus, the first signals; generating, by the processing unit and as a function of the first signals, a calibration parameter indicative of a condition of calibration of the first and second magnetometers; generating, by the processing unit and as a function of the first signals, a reliability value indicative of a condition of reliability of the first signals; calculating, by the processing unit, a first intermediate value of the lid angle based on the first signals; calculating, by the processing unit, a current value of the lid angle based on the calibration parameter, the reliability value, and the first intermediate value of the lid angle; and controlling the function of the electronic apparatus as a function of the current value of the lid angle.

In at least one embodiment, an electronic apparatus is provided that includes a first hardware element, a second hardware element, and a processing unit. The first hardware element accommodates a first magnetometer. The second hardware element accommodates a second magnetometer, orientable with respect to the first hardware element, and defining a lid angle with the first hardware element. The first and second magnetometers are configured for generating first signals that are measurements of a magnetic field external to the electronic apparatus and are indicative of a relative orientation of the first hardware element with respect to the second hardware element. The processing unit is configured to: acquire the first signals; generate, as a function of the first signals, a calibration parameter indicative of a condition of calibration of the first and second magnetometers; generate, as a function of the first signals, a reliability value indicative of a condition of reliability of the first signals; calculate a first intermediate value of the lid angle based on the first signals; calculate a current value of the lid angle based on the calibration parameter, of the reliability value, and the first intermediate value of the lid angle; and control the function of the electronic apparatus as a function of the current value of the lid angle.

In at least one embodiment, a non-transitory computer-readable medium is provided having contents which cause processing circuitry of an electronic apparatus to perform a method. The electronic apparatus includes a first hardware element accommodating a first magnetometer, and a second hardware element accommodating a second magnetometer, orientable with respect to the first hardware element, and defining a lid angle with the first hardware element, wherein the first and second magnetometers are configured for generating first signals that are measurements of a magnetic field external to the electronic apparatus and are indicative of a relative orientation of the first hardware element with respect to the second hardware element. The method includes: acquiring the first signals; generating, as a function of the first signals, a calibration parameter indicative of a condition of calibration of the first and second magnetometers; generating, as a function of the first signals, a reliability value indicative of a condition of reliability of the first signals; calculating a first intermediate value of the lid angle based on the first signals; calculating a current value of the lid angle based on the calibration parameter, the reliability value, and the first intermediate value of the lid angle; and controlling the function of the electronic apparatus as a function of the current value of the lid angle.

BRIEF DESCRIPTION OF THE SEVERAL VIEWS OF THE DRAWINGS

For a better understanding of the present disclosure, a preferred embodiment thereof is now described purely by way of non-limiting example, with reference to the attached drawings, wherein:

FIG. 3 is a side view of the portable device of FIG. 2, in three operative conditions alternative to one another;

FIG. 5 is a schematic illustration of functional blocks implemented by the portable device of FIG. 2, according to an embodiment of the present disclosure;

DETAILED DESCRIPTION

Elements and steps common to different embodiments of the present disclosure are designated hereinafter by the same reference numbers.

Figure 1:
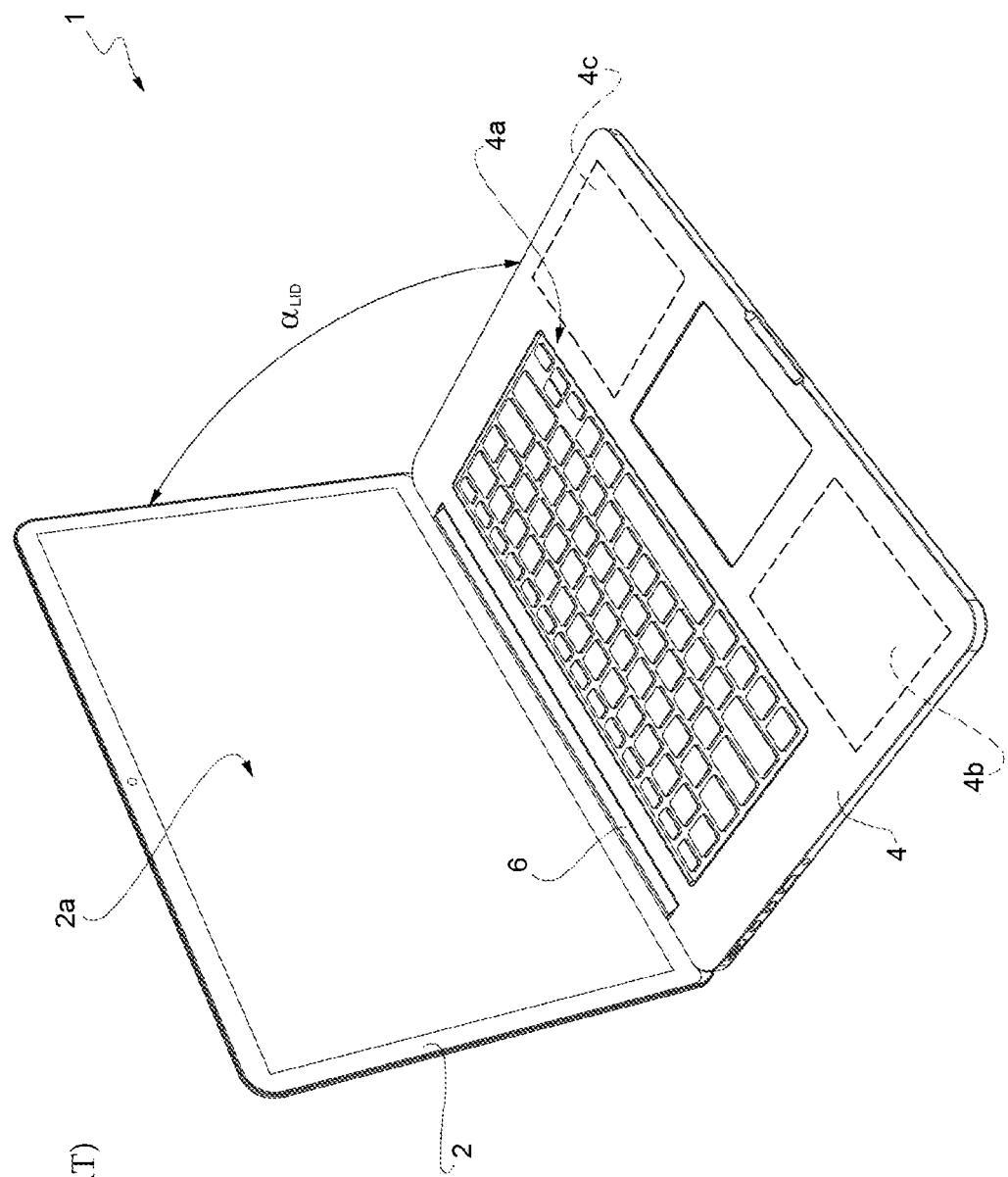
FIG. 1 is a schematic perspective view of a portable device, in particular a notebook, configured for enabling calculation of an opening angle of the screen with respect to the keypad, according to an embodiment of a known type.
Figure 2:
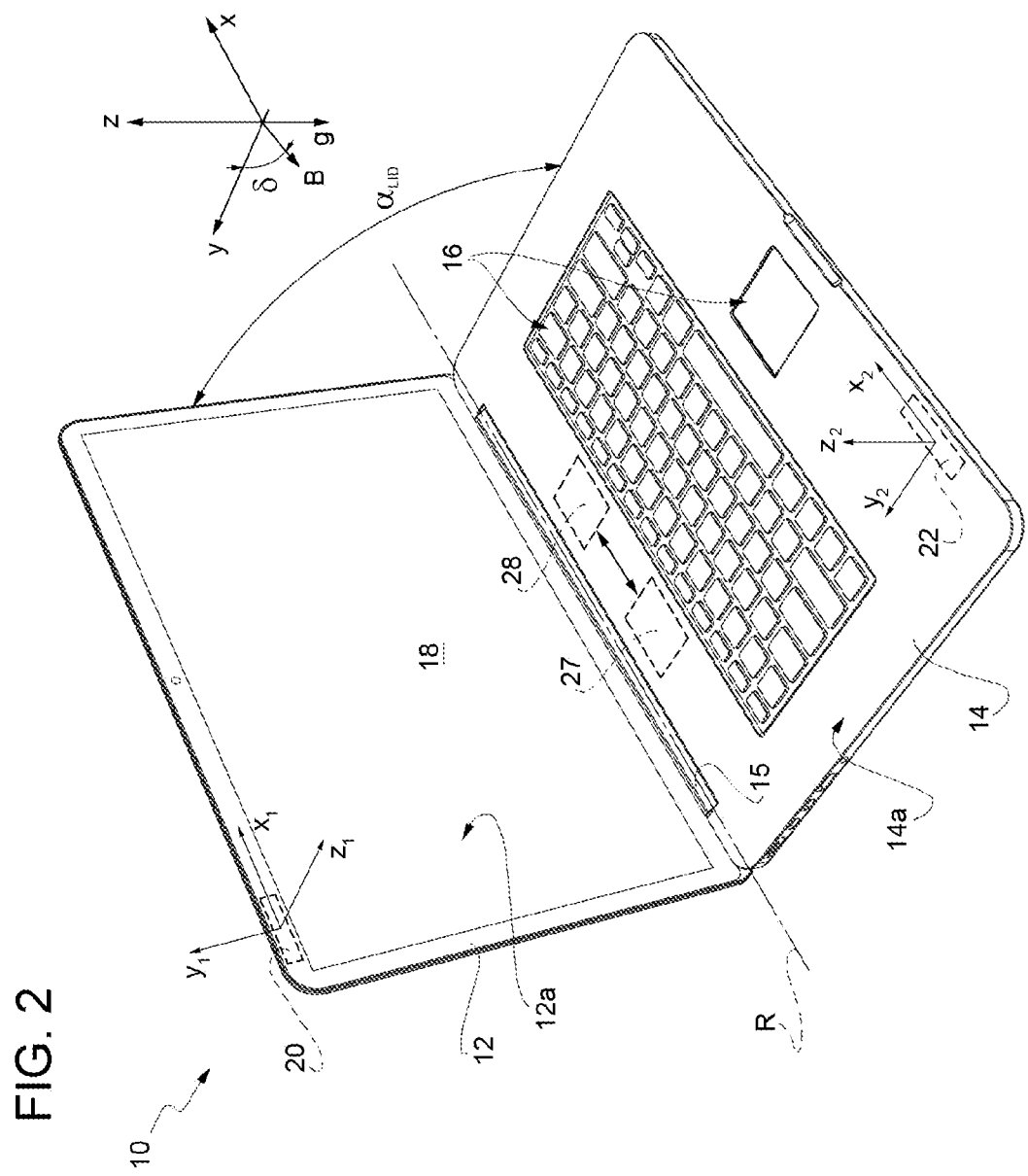
FIG. 2 is a schematic perspective view of a portable device, in particular a notebook, provided with magnetometers configured for enabling calculation of an opening angle of a screen with respect to a keypad, according to one embodiment.

With reference to FIG. 2, according to one aspect of the present disclosure, an electronic apparatus (in particular, a portable device) 10 is illustrated in a triaxial cartesian reference system XYZ defined by the axes X, Y and Z. In the reference system XYZ, a vector g (or acceleration vector g), which represents the gravity acceleration vector acting in a direction parallel to the axis Z and having an opposite orientation with respect thereto, and a vector B, which represents the Earths magnetic field vector (hereinafter, magnetic field B or magnetic-field vector B), are considered. According to an aspect of the present disclosure, the magnetic field B acts in a plane YZ defined by the axes Y, Z, and in particular forms with the axis Y an inclination angle δ, for example equal to about 45°, and forms with the acceleration vector a respective angle, for example equal to the angle of inclination δ.

The device 10 is of a portable type (in particular, a notebook) and is here represented in an operative condition of open device. The portable device 10 includes a lid portion 12 and a base portion 14, mechanically coupled to each other by means of a hinge 15, which enables rotation of the lid portion 12 with respect to the base portion 14, forming a rotation constraint about a rotation axis R (or axis R), in FIG. 2 represented by way of example parallel to the axis X. The base portion 14 comprises at least one interface device 16 (e.g., a keypad and/or a trackpad), extending at a surface 14a of the base portion 14. The lid portion 12 comprises a display region 18 (e.g., a screen or monitor), extending at a surface 12a of the lid portion 12. In an operative condition of closed device, the surfaces 12a, 14a face one another. The lid portion 12 accommodates (e.g., integrates within it) a first magnetometer 20 configured for detecting and/or calculating the orientation, along respective sensing axes $x_1$, $y_1$, $z_1$, of the lid portion 12 with respect to the magnetic field B; and the base portion 14 accommodates (e.g., integrates within it) a second magnetometer 22, configured for detecting and/or calculating the orientation, along respective sensing axes $x_2$, $y_2$, $z_2$, of the base portion 14 with respect to the magnetic field B. The first and second magnetometers 20, 22 are configured for generating a first magnetic-field signal (hereinafter, first signal $B_1$) and, respectively, a second magnetic-field signal (hereinafter, second signal $B_2$). In general, the first and second magnetometers 20, 22 are configured to detect a change of orientation of the portable device 10 by means of measurements of the magnetic field B. The first and second magnetometers 20, 22 are, for example, magnetometers obtained with MEMS technology (e.g., MEMS magnetometers based upon AMR, Anisotropic MagnetoResistance, technology). In particular, the first signal $B_1$ is indicative of the components of the magnetic field B along the sensing axes $x_1$, $y_1$, $z_1$, and the second signal $B_2$ is indicative of the components of the magnetic field B along the sensing axes $x_2$, $y_2$, $z_2$.

It is here pointed out that, in the embodiment of the portable device 10 here considered, the axis R of the hinge 15 is always parallel to the sensing axes $x_1$, $x_2$ in any operative condition (lid portion 12 closed or open) and for any orientation of the device 10 in the triaxial reference system XYZ.

The portable device 10 further comprises a processing unit that includes a microcontroller or control unit 27 and a memory 28, coupled together. The control unit 27 and/or the memory 28 are moreover operatively coupled to the first and second magnetometers 20, 22 for receiving therefrom the respective signals $B_1$, $B_2$, generated according to operation in itself known of magnetometers. The signals $B_1$, $B_2$ received at input from the control unit 27 are processed as better described hereinafter with reference to FIG. 5.

In particular, the first and second magnetometers 20, 22 are configured to detect the variation of a mutual orientation between the lid portion 12 and the base portion 14 (for example, due to opening and closing, with respect to the base portion 14, of the lid portion 12 turning about the axis R due to the hinge 15). In this latter case, in particular, the first and second magnetometers 20, 22 are used for determining an opening angle $\alpha_{LID}$, supplementary to an angle between the sensing axis $y_1$ and the sensing axis $y_2$ of the respective first and second magnetometers 20, 22. The opening angle $\alpha_{LID}$ is therefore correlated to the angle existing between the surface 12a of the lid portion 12 and the surface 14a of the base portion 14 and is also known as "lid angle". In use, it is possible to correlate the value of the lid angle $\alpha_{LID}$ with a use mode of the portable device 10 (e.g., a lid angle $\alpha_{LID}$ having a value of about 130° suggests a laptop-use mode, whereas a lid angle $\alpha_{LID}$ having a value of 360° suggests a tablet-use mode. It is therefore possible to adapt the graphic interface represented in the display region 18 to the type of operating mode, or else adapt other operating parameters of the portable device 10, for example enabling a touchscreen function when the tablet-use mode is detected, or vary other parameters still, such as switching-on/switching-off of the display region 18 or of the portable device 10 if the value the lid angle $\alpha_{LID}$ is greater/less than a certain threshold.

FIG. 3 illustrates, in lateral view in the plane YZ, the portable device 10 of FIG. 2, where the lid portion 12 is represented in three possible operative conditions S1-S3: lid portion 12 closed on the base portion 14, defining a lid angle $\alpha_{LID}$ of zero value (S1); lid portion 12 defining a lid angle $\alpha_{LID}$ of 90° with respect to the base portion 14 (S2); and lid portion 12 defining a lid angle $\alpha_{LID}$ of 180° with respect to the base portion 14 (S3).

In the operative conditions S1-S3, the lid angle $\alpha_{LID}$ is the relative angle between the sensing axis $y_1$ and the sensing axis $y_2$ of the magnetometers 20 and 22 (in detail, between the positive semi-axis of the axis $y_1$ and the negative semi-axis of the axis $y_2$) and, since it has been assumed that said sensing axes $y_1$, $y_2$ are parallel to the surfaces 12a, 14a of the lid portion 12 and the base portion 14, the lid angle $\alpha_{LID}$ is also the relative angle between the surfaces 12a, 14a of the lid portions 12 and the base portion 14. In other words, the lid angle $\alpha_{LID}$ coincides with the opening angle (or lid angle) of the lid portion 12 with respect to the base portion 14. The same angular quantity may likewise be defined between the axes $z_1$ and $z_2$ (in detail, between the positive semi-axis of the axis $z_1$ and the negative semi-axis of the axis $z_2$), which are always normal to the surfaces 12a, 14a.

Passing from the operative condition S1 to the operative condition S2 (or likewise from the operative condition S2 to the operative condition S3), the first magnetometer 20 detects a variation of the components of the magnetic field B along the axes $z_1$ and $y_1$, and this makes it possible to determine the fact that the lid angle $\alpha_{LID}$ increases (whereas the opposite is true, in the passage from the condition S2 to the condition S1, or from the condition S3 to the condition S2).

It may, in particular, be noted that the magnetic field B is given, in the operative condition S1, by first values detected on the axes $y_1$, $z_1$ and, in the operative condition S2, by second values detected on the axes $y_1$, $z_1$, said second values being different from the first values.

In order to calculate a value of the lid angle $\alpha_{LID}$, it is possible to exploit the projection of the magnetic field B on the respective three sensing axes of the first and second magnetometers 20, 22, taking into consideration the constraints due to the presence of the hinge 15. In this case, a value $\alpha_{LID\_MAG}$ of the angle $\alpha_{LID}$ calculated via the magnetometers 20, 22 is obtained by applying the following expression:

$$\alpha_{LID\_MAG} = \arctan 2\left(\frac{Gz_2 \cdot Gy_1 - Gy_2 \cdot Gz_1}{Gz_2 \cdot Gz_1 + Gy_2 \cdot Gy_1}\right) + \pi(\text{rad}) \quad (1)$$

where arctan 2 is the known trigonometric function, $Gz_1$ is the component of the magnetic field B detected by the first magnetometer 20 along the sensing axis $z_1$, $Gy_1$ is the component of the magnetic field B detected by the first magnetometer 20 along the sensing axis $y_1$, $Gz_2$ is the component of the magnetic field B detected by the second magnetometer 22 along the sensing axis $z_2$, and $Gy_2$ is the component of the magnetic field B detected by the second magnetometer 22 along the sensing axis $y_2$. As represented by Eq. (1), the value $\alpha_{LID\_MAG}$ measured via the magnetometers 20, 22 represents a relative orientation (i.e., an orientation that is not absolute in space) between the lid portion 12 and the base portion 14.

Figure 4A:
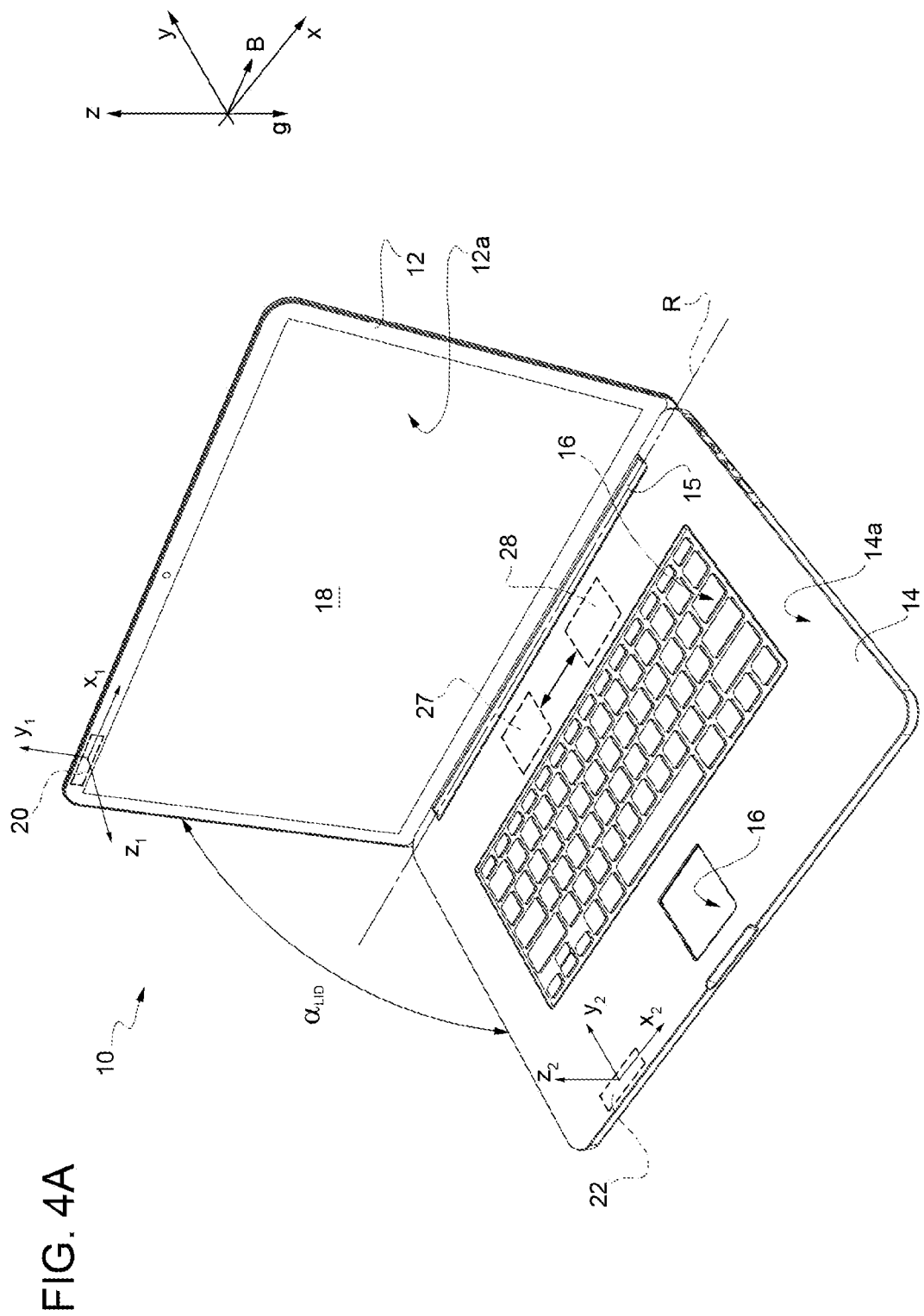
FIGS. 4A-4B are schematic perspective views of the portable device of FIG. 2 in respective further operative conditions.

FIG. 4A shows a mode of use of the portable device 10 where the portable device 10 is oriented with the axis R parallel to the magnetic-field vector B. In this case, passage into the operative conditions S1-S2-S3 does not cause a variation of the component of magnetic field B along the sensing axes $z_1$, $z_2$, and $y_1$, $y_2$ of the first and second magnetometers 20, 22, since the components of the magnetic field B along the axes referred to are always zero or substantially zero (i.e., the values $Gz_1$, $Gz_2$, $Gy_1$, $Gy_2$ of Eq. (1) are approximately equal to zero). Consequently, in this situation the value $\alpha_{LID\_MAG}$ cannot be calculated accurately. What has been described with reference to FIG. 4A may be applied, in a way in itself obvious, also to the operative condition (not illustrated) where the portable device 10 is oriented with the axis R parallel to the magnetic-field vector B, but rotated through 180° with respect to the orientation shown in FIG. 4A.

Figure 4B:
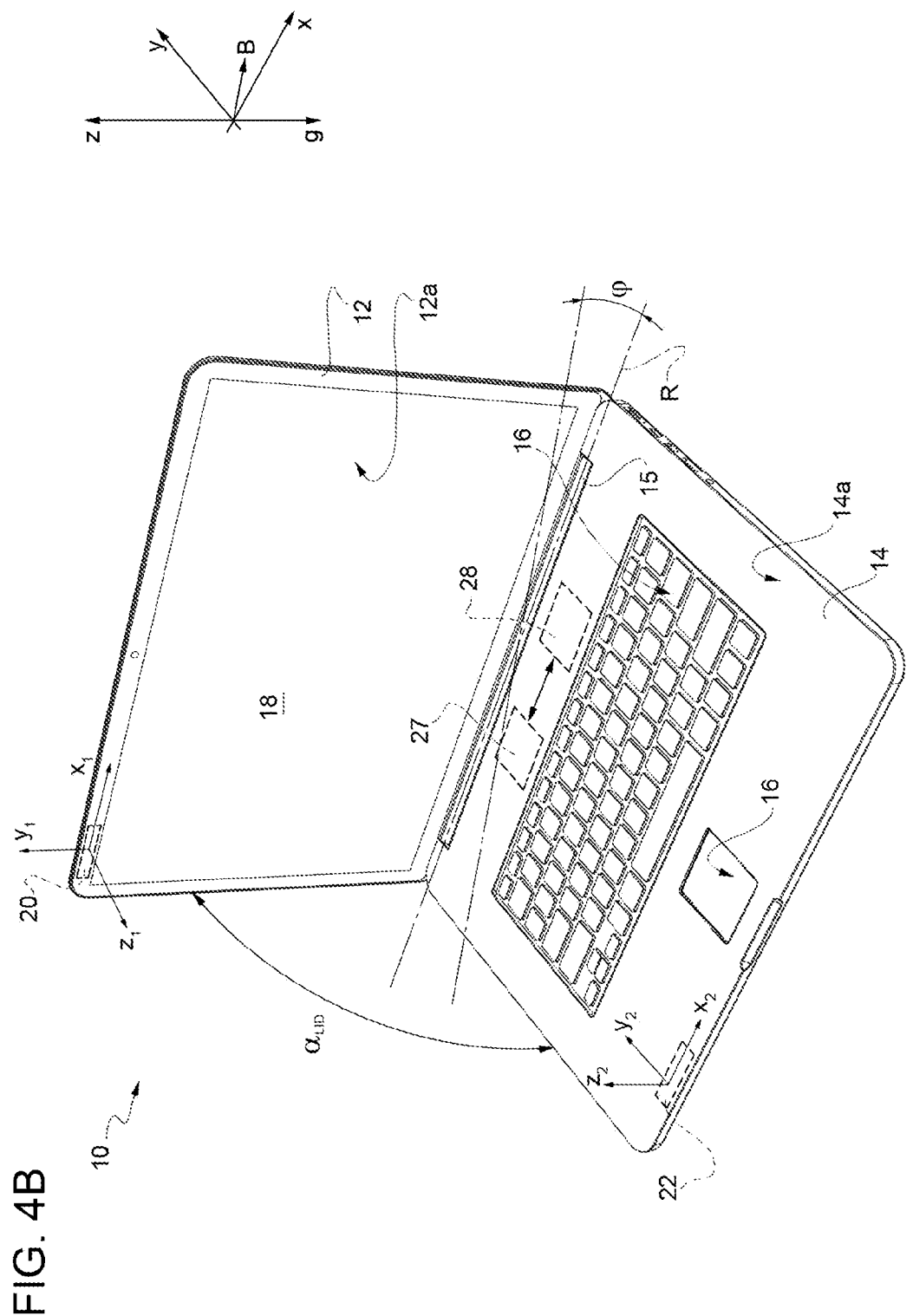

With reference to FIG. 4B an intermediate situation of orientation is shown, where the axis R forms with the magnetic-field vector B a reliability angle φ other than 0° and smaller than or equal to 90°. These intermediate situations of orientation lead to measurements of the value $\alpha_{LID\_MAG}$ that are all the more erroneous, the more closely they approach the condition of FIG. 4A (axis R parallel to the magnetic-field vector B), i.e., the closer the reliability angle φ is to 0°.

In operative conditions where the sensing axes $x_1$ and $x_2$ are parallel to the magnetic field B and the sensing axes $y_1$ and $y_2$ are perpendicular to the magnetic field B (FIG. 4A), the components $Gx_1$ and $Gx_2$ have a maximum value, and the components $Gy_1$ and $Gy_2$ have a minimum value; instead, in operative conditions where the sensing axes $x_1$ and $x_2$ are perpendicular to the magnetic field B and the sensing axes $y_1$ and $y_2$ are parallel to the magnetic field B, the components $Gx_1$ and $Gx_2$ have a minimum value and the components $Gy_1$ and $Gy_2$ have a maximum value (the minimum and maximum values depend upon the type of inertial sensor used and are defined by the manufacturer).

The reliability of the calculation of the value $\alpha_{LID\_MAG}$ is therefore correlated to a first reliability angle $\varphi_1$, which represents the measurement of the reliability angle φ made via the magnetometers 20, 22.

According to an aspect of the present disclosure, a first angle $\varphi_a$ is calculated via the first magnetometer 20 according to the following expression:

$$\varphi_a = \tan^{-1} \frac{\sqrt{Gy_1^2 + Gz_1^2}}{|Gx_1|} \text{(rad)} \quad (2)$$

The first angle $\varphi_a$ therefore varies between 0° and 90°. Likewise, a second angle $\varphi_b$ is calculated via the second magnetometer 22.

The first reliability angle $\varphi_1$ is correlated to the first angle $\varphi_a$ and/or the second angle $\varphi_b$. According to one aspect of the present disclosure, the first reliability angle $\varphi_1$ is equal to the first angle $\varphi_a$ or to the second angle $\varphi_b$; according to a different aspect of the present disclosure, the first reliability angle $\varphi_1$ is equal to an average (alternatively, a weighted average) of the first and second angles $\varphi_a$, $\varphi_b$.

If the first reliability angle $\varphi_1$ is greater than a threshold angle $\varphi_{th}$, the measurement of the value $\alpha_{LID\_MAG}$ is considered reliable; and if the first reliability angle $\varphi_1$ is smaller than or equal to the threshold angle $\varphi_{th}$, the measurement of the value $\alpha_{LID\_MAG}$ is considered unreliable. For instance, the threshold angle $\varphi_{th}$ is equal to approximately 20°. Alternatively, the measurement of the value $\alpha_{LID\_MAG}$ is considered reliable only if both of the angles $\varphi_a$, $\varphi_b$ are greater than the threshold angle $\varphi_{th}$.

According to an aspect of the present disclosure, the control unit 27, with the possible support of the memory 28, is configured for executing the operations illustrated in FIG. 5 and described hereinafter. FIG. 5 is a schematic illustration of functional blocks implemented, via software and in an iterative way, by the control unit 27 and memory 28.

It is evident that the functional blocks of FIG. 5 can be implemented in hardware in a way in itself evident to the person skilled in the art.

In particular, at each instant (or iteration) t (e.g., 0<t<N, with N>1), the control unit 27 acquires the first signal $B_1$ and the second signal $B_2$ via the first magnetometer 20 and the second magnetometer 22, respectively. The first signal $B_1$ represents (e.g., comprises) the components $Gx_1$, $Gy_1$, and $Gz_1$ (in particular, $Gx_1(t)$, $Gy_1(t)$, and $Gz_1(t)$), and the second signal $B_2$ represents (e.g., comprises) the components $Gx_2$, $Gy_2$, and $Gz_2$ (in particular, $Gx_2(t)$, $Gy_2(t)$, and $Gz_2(t)$).

A calibration block 49 receives at input the components $Gx_1(t)$, $Gy_1(t)$, $Gz_1(t)$, $Gx_2(t)$, $Gy_2(t)$, and $Gz_2(t)$, and returns at output a first calibration value $J_1$, indicative of the possible presence of magnetic interference and magnetic distortion of the magnetometers 20, 22. In general, the first calibration value $J_1$ is correlated to a calibration reliability of the magnetometers 20, 22. The first calibration value $J_1$ may be a binary value in the case of single threshold (reliable/unreliable calibration, for example $J_1=1$ and, respectively, $J_1=0$), or else a value proportional to a degree of reliability of calibration detected.

Figure 5A:
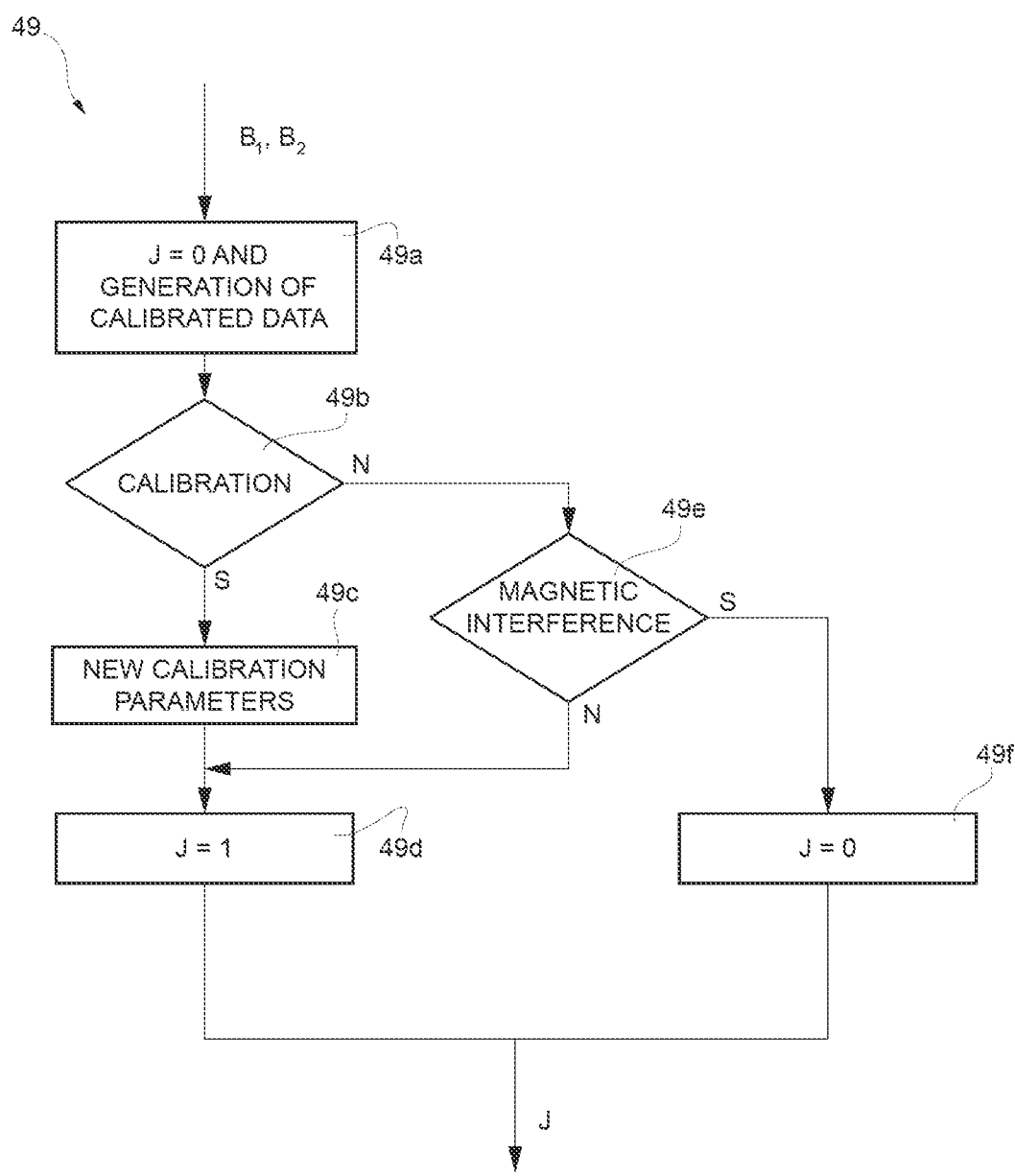
FIG. 5A is a schematic illustration of functional blocks included in one of the functional blocks of FIG. 5, according to an embodiment of the present disclosure.

The calibration block 49 is illustrated in detail in FIG. 5A, with reference to the case where the first calibration value $J_1$ assumes a binary value.

In a block 49a, the first calibration value $J_1$ is initialised at 0 (unreliable calibration). In addition, in block 49a the control unit 27 acquires, via the magnetometers 20, 22, calibration data $D_1$ (e.g., equal to the signals $B_1$, $B_2$, or else comprising a result of processing of the signals $B_1$, $B_2$ acquired in a first calibration interval). Furthermore, at the first iteration (t=1) there is performed, as better described hereinafter, a calibration in order to generate calibration parameters $P_{cal}$ correlated to the electromagnetic conditions to which the magnetometers 20, 22 are subjected. In particular, the calibration parameters $P_{cal}$ include a soft iron matrix (SI) and a hard-iron vector (HI), and are calculated in a way in itself known. Moreover, both at the first iteration (t=1) and at the subsequent iterations (t>1), calibrated data $D_2$ are generated on the basis of the calibration data $D_1$ and of the calibration parameters $P_{cal}$. In detail, the calibrated data $D_2$ are the result of processing of the calibration data $D_1$ performed via the calibration parameters $P_{cal}$.

In a block 49b that follows block 49a, a condition regarding calibration of the magnetometers 20, 22 is evaluated. In particular, it is determined whether it is necessary or desired to carry out a calibration of the magnetometers 20, 22. This calibration enables compensation of electromagnetic effects to which the magnetometers 20, 22 are subjected, due to factors such as variations in time of magnetization of components arranged in the proximity to the magnetometers themselves or the presence of ferromagnetic material. In detail, in block 49b the control unit 27 compares the calibrated data $D_2$ with an expected range (e.g., defined between approximately 0.25 gauss and approximately 0.75 gauss), correlated to an expected intensity of the Earths magnetic field. If a Euclidean norm $|D_2|$ of the calibrated data $D_2$ satisfies, at the current iteration t, a first relation (e.g., it is comprised in said expected range and, for instance, is comprised between approximately 0.25 gauss and approximately 0.75 gauss, extremes included) the condition on the calibration of the magnetometers 20, 22 yields a negative result, and it is not necessary to carry out a new calibration; if the Euclidean norm $|D_2|$ of the calibrated data $D_2$ does not satisfy, at the current iteration t, said first relation (e.g., it is not comprised in the expected range, and for instance it is less than 0.25 gauss or greater than 0.75 gauss) the condition on the calibration of the magnetometers 20, 22 yields a positive result, and it is necessary to carry out the new calibration.

If it is necessary to carry out calibration of the magnetometers 20, 22 (output "YES" from block 49b), said calibration is carried out, according to known techniques (e.g., via sphere-fitting or ellipsoid-fitting algorithms), in a block 49c, which follows block 49b in the case of output "YES". In detail, the portable device 10 is rotated freely in three-dimensional space by the operator, and simultaneously the control unit 27 acquires the signals $B_1$, $B_2$ during a second calibration interval, via the magnetometers 20, 22. The signals $B_1$, $B_2$ acquired during the second calibration interval are processed according to known techniques for generating new calibration parameters $P_{cal}$, which replace the previous calibration parameters $P_{cal}$. During the second calibration interval, the first calibration value $J_1$ is set at 0.

In a block 49d following block 49c, the first calibration value $J_1$ is set at 1, to indicate that the calibration is reliable.

If it is not necessary to carry out calibration of the magnetometers 20, 22 (output "NO" from block 49b), a condition regarding magnetic interference (e.g., interference caused by electromagnetic sources set in the proximity of the portable device 10) is evaluated. In particular, in a block 49e following block 49b in the case of output "NO", it is determined whether the magnetometers 20, 22 are subjected to magnetic interference. In particular, the calibrated data $D_2$ are evaluated in time to determine whether the magnetometers 20, 22 are subjected to magnetic interference. In greater detail, if the Euclidean norm $|D_2|$ of the calibrated data $D_2$ satisfies a second relation (e.g., it does not vary significantly in time), the check on the condition regarding magnetic interference yields a negative result, and magnetic interference is not present; if the Euclidean norm $|D_2|$ of the calibrated data $D_2$ does not satisfy the second relation (e.g., it varies significantly in time), the check on the condition regarding magnetic interference yields a positive result, and magnetic interference is present. For instance, the second relation is satisfied if the variance of the Euclidean norm $|D_2|$ of the calibrated data $D_2$ is less than a given threshold.

If no magnetic interference is present (output "NO" from block 49e), the procedure described of block 49d is again carried out, and then the first calibration value $J_1$ is set at 1 to indicate that the calibration is reliable.

If magnetic interference is present (output "YES" from block 49e), the first calibration value $J_1$ is set at 0 in a block 49f following block 49e in the case of output "YES", to indicate that the calibration is unreliable.

At output from the calibration block 49, there is therefore the first calibration value $J_1$, which, if it is equal to 0, indicates that the calibration is unreliable (and therefore also the measurement of the value $\alpha_{LID}$ MAG will not be reliable), whereas, if it is equal to 1, indicates that the calibration is reliable (and therefore the measurement of the value $\alpha_{LID\_MAG}$ could be reliable, as described hereinafter).

With reference to FIG. 5, in a typical condition of use of the portable device 10, the base portion 14 lies in a horizontal plane XY, resting on an ideally flat surface. Since the magnetometers 20, 22 are in a fixed position and the orientation of the respective sensing axes is known, it is possible to calculate, via the control unit 27, the value $\alpha_{LID\_MAG}$ (in particular, $\alpha_{LID\_MAG}(0)$ of the lid angle $\alpha_{LID}$ (in particular, $\alpha_{LID}(t)$) as expressed by Eq. (1). In detail, a first calculation block 50 implements Eq. (1), receiving at input the components $Gx_1(t)$, $Gy_1(t)$, $Gz_1(t)$, $Gx_2(t)$, $Gy_2(t)$, and $Gz_2(t)$, and returning at output the value $\alpha_{LID\_MAG}(t)$ of the lid angle $\alpha_{LID}(t)$.

A first reliability block 52 receives at input, from the first and second magnetometers 20, 22, the components $Gx_1(t)$, $Gy_1(t)$, $Gz_1(t)$, $Gx_2(t)$, $Gy_2(t)$, and $Gz_2(t)$ and implements Eq. (2) for calculating the first reliability angle $\varphi_1$ (in particular, $y_1(t)$), as described previously. The first reliability angle $\varphi_1(t)$ is then compared, as discussed previously, with the threshold angle $\varphi_{th}$ to establish the reliability of the calculation of the value $\alpha_{LID\_MAG}(t)$. The first reliability block 52 therefore generates at output a first reliability value $K_1$, which may be a binary value in the case of single threshold (reliable/unreliable, for example $K_1=1$ and, respectively, $K_1=0$), or else a value proportional to a degree of reliability detected. In this latter case, it is possible to envisage a plurality of thresholds of comparison of the first reliability angle $\varphi_1(t)$, so that the first reliability value $K_1$ will vary according to a staircase function, associating a different first reliability value $K_1$ when each threshold provided is exceeded. The first reliability value $K_1$ will therefore vary between a minimum value and a maximum value the more the components $Gx_1(t)$ and $Gx_2(t)$ decrease and the components $Gy_1(t)$, $Gy_2(t)$, $Gz_1(t)$ and $Gz_2(t)$ increase; the minimum reliability value $K_1$ may be the zero value, whereas the maximum reliability value $K_1$ is chosen between 0 (excluded) and 1 according to the considerations that will be made in what follows with reference to block 56. Moreover, the first reliability value $K_1$ is correlated to the first calibration value $J_1$. In detail, if the first calibration value $J_1$ is equal to 0 (unreliable calibration), the first reliability value $K_1$ is set at 0 (measurement of the value $\alpha_{LID\_MAG}(t)$ unreliable); if the first calibration value $J_1$ is equal to 1 (reliable calibration), the first reliability value $K_1$ is determined on the basis of what has been described previously. Likewise, if the first calibration value $J_1$ assumes said proportional values, the first reliability value $K_1$ is determined on the basis of what has been described previously and moreover is weighted as a function of the first calibration value $J_1$ in a known way (e.g., $K_1=K_1 \cdot J_1$).

A determination block 53 receives at input the first reliability value $K_1$ from the first reliability block 52 and the value $\alpha_{LID\_MAG}(t)$ from the first calculation block 50, and determines the lid angle $\alpha_{LID}(t)$.

According to one embodiment, where the first reliability value $K_1$ assumes a binary value, the lid angle $\alpha_{LID}(t)$ is equal to the value $\alpha_{LID\_MAG}(t)$ if $K_1=1$ (i.e., if the measurement of the value $\alpha_{LID\_MAG}(t)$ is reliable), and is independent of the value $\alpha_{LID\_MAG}(t)$ if $K_1=0$ (i.e., if the measurement of the value $\alpha_{LID\_MAG}(t)$ is unreliable). For instance, if $K_1=0$ the lid angle $\alpha_{LID}(t)$ is not updated and therefore is equal to $\alpha_{LID\_MAG}(t-1)$. In the case where at the first iteration (t=1) the measurement of the value $\alpha_{LID\_MAG}(t)$ is not reliable, the lid angle $\alpha_{LID}(t)$ is set equal to a predefined value; for example, it is set equal to 0°.

According to a different embodiment, where the first reliability value $K_1$ assumes said proportional values, the lid angle $\alpha_{LID}(t)$ is calculated, on the basis of the value $\alpha_{LID\_MAG}(t)$ and as a function of the first reliability value $K_1$, via a dynamic lowpass filter or a complementary filter. For instance, the lid angle $\alpha_{LID}(t)$ is calculated via the following expression:

$$\alpha_{LID}(t)=(1-K_1')\cdot\alpha_{LID}(t-1)+K_1'\cdot\alpha_{LID\_MAG}(t)(\text{rad}) \quad (3)$$

where $K_1=n \, K_1$, with n=1 according to one aspect of the present disclosure or else, according to a different aspect of the present disclosure, $0<n=n_{max}$(e.g., $n_{max}=0.1$) in order to reduce the noise of the magnetometers 20, 22. In the case where at the first iteration (t=1) the measurement of the value $\alpha_{LID\_MAG}(t)$ is not reliable, the lid angle $\alpha_{LID}(t)$ is set equal to a predefined value; for example, it is set equal to 0°. In addition, at the first iteration (t=1), since the value $\alpha_{LID}(t-1)$ corresponding to the previous instant t−1 does not exist, $\alpha_{LID}(t)$ is, for example set at a value equal to $\alpha_{LID\_MAG}(t)$, or else at a predefined value.

Alternatively, calculation of the lid angle $\alpha_{LID}$ may take into account directly and explicitly the first calibration value $J_1$. In this case, the first reliability value $K_1$ is not correlated to the first calibration value $J_1$ and, for example, Eq. (3) implemented in the determination block 53 is replaced by the following expression:

$$\alpha_{LID}(t)=(1-J_1 \cdot K_1)\cdot\alpha_{LID}(t-1)+J_1 \cdot K_1 \cdot \alpha_{LID\_MAG}(t)(\text{rad}) \quad (3\text{bis})$$

Figure 6:
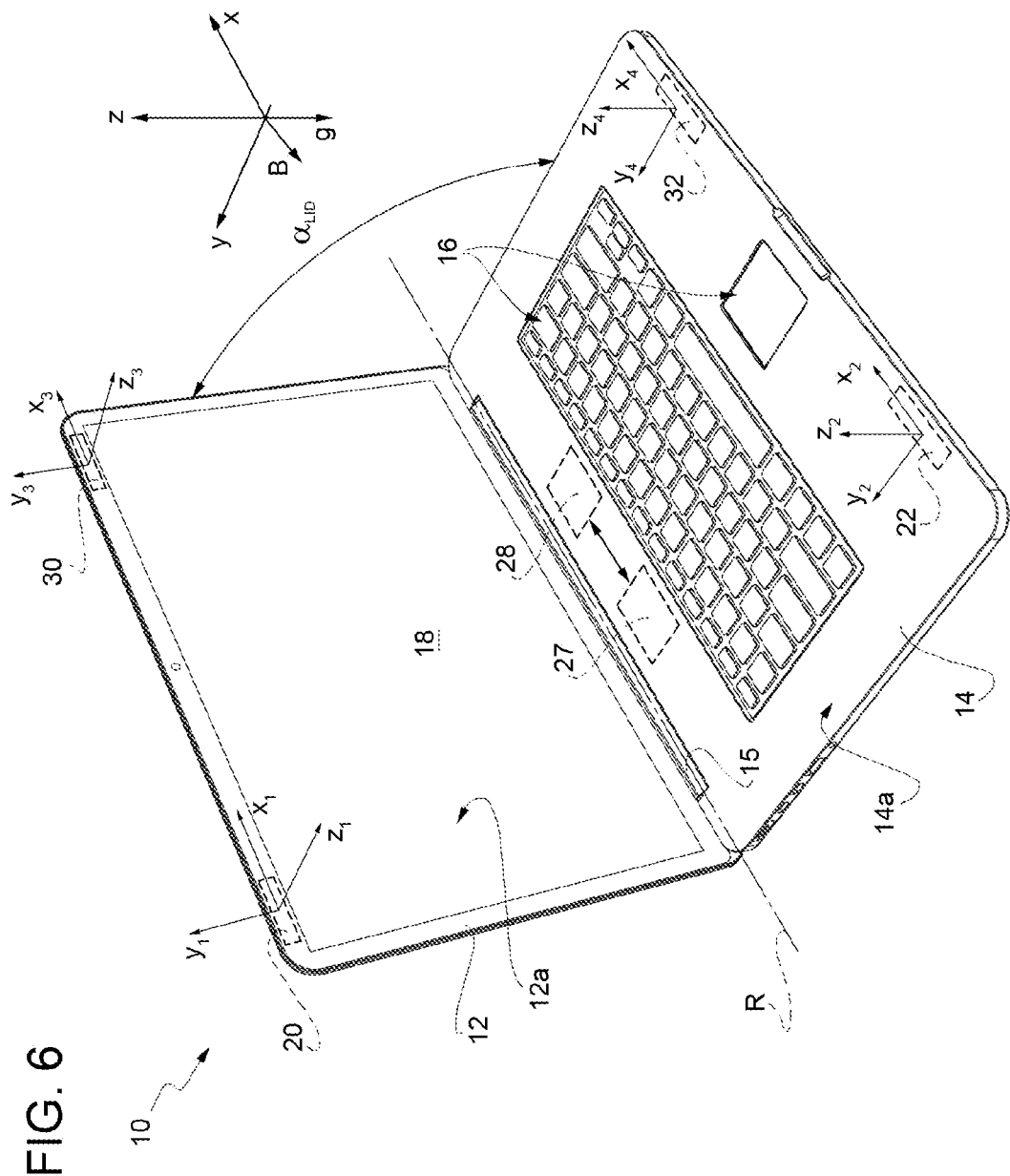
FIG. 6 is a schematic perspective view of a portable device, in particular a notebook, provided with magnetometers and accelerometers configured for enabling calculation of an opening angle of a screen with respect to a keypad, according to a different embodiment.

FIG. 6 shows the portable device 10 in a different embodiment, analogous to the one illustrated in FIG. 2.

In particular, with reference to the embodiment of FIG. 6, the lid portion 12 moreover accommodates (e.g., integrates within it) a first accelerometer 30, configured for detecting and/or calculating values of acceleration of the lid portion 12 along respective sensing axes $x_3$, $y_3$, $z_3$, parallel to the sensing axes $x_1$, $y_1$, $z_1$, respectively, of the first magnetometer 20; and the base portion 14 moreover accommodates (e.g., integrates within it) a second accelerometer 32, configured for detecting and/or calculating values of acceleration of the base portion 14 along respective sensing axes $x_4$, $y_4$, $z_4$, parallel to the sensing axes $x_2$, $y_2$, $z_2$, respectively, of the second magnetometer 22. It is here pointed out that, in the embodiment here considered, the axis R of the hinge 15 is always parallel to the sensing axes $x_1$, $x_2$, $x_3$, $x_4$ in any operative condition (lid portion 12 closed or open) and for any orientation of the device 10 in the triaxial reference system XYZ. The first and second accelerometers 30, 32 are operatively coupled to the control unit 27 and/or to the memory 28 and are configured to detect a movement and/or change of orientation of the portable device 10 by measuring accelerations. The first and second accelerometers 30, 32 are, for example, accelerometers obtained with MEMS technology.

In particular, as has been described with reference to FIG. 3, in the passage from the operative condition S1 to the operative condition S2 (or likewise from the operative condition S2 to the operative condition S3), the first accelerometer 30 detects a variation of the component of the acceleration of gravity g along the axes $z_3$ and $y_3$ and determines that the angle $\alpha_{LID}$ has increased (the reverse applies in the passage from the condition S2 to the condition S1, or from the condition S3 to the condition S2).

It is to be noted, in particular, that the acceleration of gravity g is given, in the operative condition S1, exclusively by the value detected along the axis $z_3$ and, in the operative condition S2, exclusively by the value detected along the axis $y_3$. In an intermediate condition, for example when the angle $\alpha_{LID}$ is equal to 45°, both of the axes $y_3$ and $z_3$ yield the same value of acceleration.

In the operative condition S1, the sensing axis $z_3$ is parallel to the gravity acceleration vector g (the projection of the gravity acceleration vector g on the axis $z_3$ is maximum), in the operative condition S2, the sensing axis $z_3$ is orthogonal to the gravity acceleration vector g (the projection of the gravity acceleration vector g on the axis $z_3$ is minimum), and in the operative condition S3, the sensing axis $z_3$ is parallel to the gravity acceleration vector g, but has an opposite orientation as compared to the operative condition S1 (the projection of the gravity acceleration vector g on the axis $z_3$ is maximum, but with opposite sign).

In order to calculate a value of the angle $\alpha_{LID}$, it is possible to exploit the projection of the gravity acceleration vector g on the respective three sensing axes of the first and second accelerometers 30, 32, taking into consideration the constraints due to the presence of the hinge 15. In this case, a value $\alpha_{LID\_ACC}$ of the angle $\alpha_{LID}$ can be calculated as:

$$\alpha_{LID\_ACC} = \arctan 2\left\{\frac{Az_4 \cdot Ay_3 - Ay_4 \cdot Az_3}{Az_4 \cdot Az_3 + Ay_4 \cdot Ay_3}\right\} + \pi (\text{rad}) \quad (4)$$

where arctan 2 is the known trigonometric function, $Az_3$ is the value of acceleration detected by the first accelerometer 30 along the sensing axis $z_3$, $Ay_3$ is the value of acceleration detected by the first accelerometer 30 along the sensing axis $y_3$, $Az_4$ is the value of acceleration detected by the second accelerometer 32 along the sensing axis $z_4$, and $Ay_4$ is the value of acceleration detected by the second accelerometer 32 along the sensing axis $y_4$. Eq. (4) shows how the value $\alpha_{LID\_ACC}$ measured via the accelerometers 30, 32 represents a relative orientation (i.e., an orientation that is not absolute in space) between the lid portion 12 and the base portion 14.

When the portable device 10 is oriented with the axis R parallel to the axis Z, i.e., parallel to the gravity vector g (portable device 10 open like a book), passage into the operative conditions S1-S2-S3 does not cause a variation of the component of acceleration along the sensing axes $z_3$, $z_4$, $y_3$, and $y_4$ of the first and second accelerometers 30, 32 since the component of the acceleration of gravity g along the axes indicated is always zero or substantially zero (the values $Az_3$, $Az_4$, $Ay_3$, and $Ay_4$ of Eq. (4) are approximately equal to zero).

Situations of intermediate orientation, where the axis R forms an angle of less than 90°, but greater than 0°, with the axis Z, lead to measurements of the value $\alpha_{LID\_ACC}$ that are all the more erroneous the more closely they approach the condition where the axis R is parallel to the axis Z.

What has been described previously may be applied, in a way in itself obvious, also to the operative condition where the portable device 10 is oriented with the axis R parallel to the axis Z, but rotated through 180° with respect to what has been discussed previously.

In particular, the reliability of the calculation of the value $\alpha_{LID\_ACC}$ is therefore correlated to a second reliability angle $\varphi_2$, which represents the measurement of the reliability angle $\varphi$ made via the accelerometers 30, 32.

According to one aspect of the present disclosure, a third angle (pc is calculated via the first accelerometer 30 according to the following expression:

$$\varphi_c = \tan^{-1}\frac{\sqrt{Ay_s^2 + Az_s^2}}{|Ax_s|} \quad (5)$$

where $Ax_3$ is the value of acceleration detected by the first accelerometer 30 along the sensing axis $x_3$. The third angle (pc therefore varies between 0° and 90°. Likewise, a fourth angle spa is calculated via the second accelerometer 32.

The second reliability angle $\varphi_2$ is correlated to the third angle (pc and/or to the fourth angle $\varphi_a$, as has been described previously with reference to the first reliability angle $\varphi_1$.

If the second reliability angle $\varphi_2$ is greater than a further threshold angle (e.g., equal to the threshold angle $\varphi_{th}$), the measurement of the value $\alpha_{LID\_ACC}$ is considered reliable, and if the second reliability angle $\varphi_2$ is smaller than or equal to said further threshold angle, the measurement of the value $\alpha_{LID\_ACC}$ is considered unreliable. Alternatively, the measurement of the value $\alpha_{LID\_ACC}$ is considered reliable only if both of the angles $\varphi_c$, $\varphi_d$ are greater than the further threshold angle.

In order to prevent the measurements of the angle $\alpha_{LID}$ from presenting an increasingly lower reliability the more closely they approach the condition of FIG. 4A (axis R parallel to the magnetic field B), as described for the portable device 10 of FIG. 2, in the embodiment of FIG. 6 the measurements obtained by the first and second accelerometers 30, 32 are fused with the measurements obtained by the first and second magnetometers 20, 22; for example, the measurements obtained from the first and second accelerometers 30, 32 are more weighted (and, accordingly, the measurements obtained from the first and second magnetometers 20, 22 are less weighted), the smaller the angle between the axis R and the magnetic field B (i.e., the more closely the condition of FIG. 4A is approached). In this way, the reliability of the measurement of the angle $\alpha_{LID}$ is guaranteed both when the axis R is parallel to the magnetic field B and when it is parallel to the acceleration of gravity g (i.e., parallel to the axis Z). Since the magnetic field B and the acceleration of gravity g are mutually orthogonal, the measurement of the angle $\alpha_{LID}$, made as described more fully hereinafter, is always reliable.

Figure 7:
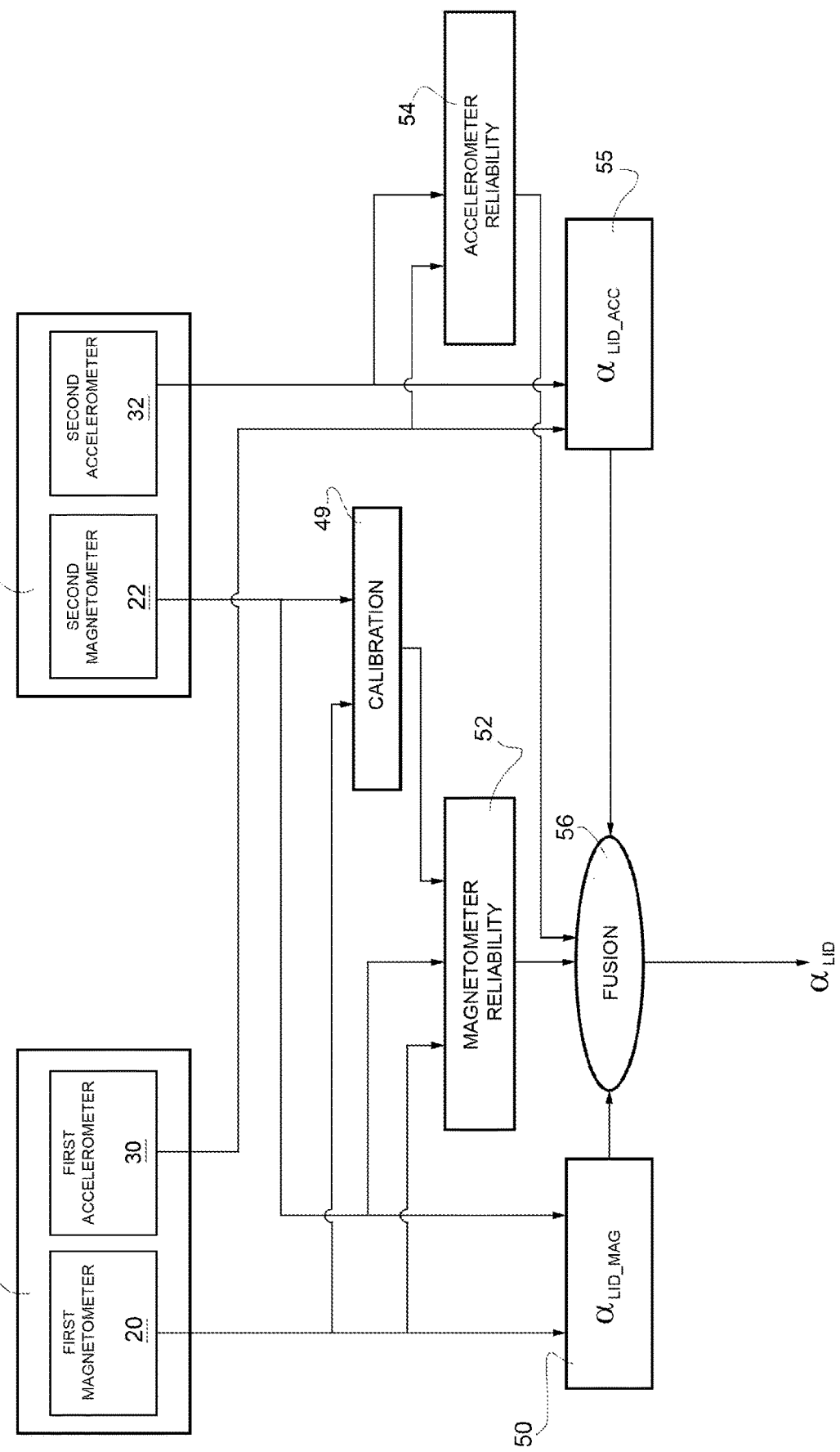
FIG. 7 is a schematic illustration of functional blocks implemented by the portable device of FIG. 6, according to an embodiment of the present disclosure.

According to one aspect of the present disclosure, the control unit 27, with the optional support of the memory 28, is moreover operatively connected to the accelerometers 30, 32 and is configured for executing the operations illustrated in FIG. 7 and described hereinafter. FIG. 7 is a schematic illustration of functional blocks analogous to the ones illustrated in FIG. 5.

In particular, moreover, a second calculation block 55 is represented in FIG. 7 and configured for receiving at input the values of acceleration (comprising, in detail, the components $Ay_3$, $Az_3$, $Ay_4$ and $Azo$) detected by the first and second accelerometers 30, 32, and calculating the value $\alpha_{LID\_ACC}$ of the lid angle $\alpha_{LID}$ on the basis of Eq. (4).

Optionally, a second reliability block 54 is moreover present, receiving at input, from the first and second accelerometers 30, 32, the components $Ax_3(t)$, $Ay_3(t)$, $Az_3(t)$, $Ax_4(t)$, $Ay_4(t)$, and $Az_4(t)$, and implementing Eq. (5) for calculating the second reliability angle $\varphi_2$ (in particular, $\varphi_2(t)$). As has been described previously with reference to the first reliability angle $\varphi_1$, the second reliability angle $\varphi_2(t)$ is then compared with the further threshold angle to establish the reliability of the calculation of the value $\alpha_{LID\_ACC}(t)$. The second reliability block 54 therefore generates at output a second reliability value $K_2$ analogous to the first reliability value $K_1$.

A first fusion block 56, replacing in FIG. 7 the determination block 53 of FIG. 5, has the function of generating a final value, deemed reliable, of the lid angle $\alpha_{LID}$ on the basis of the first reliability value $K_1$ and/or the second reliability value $K_2$. The first fusion block 56 receives at input the first reliability value $K_1$ and/or the second reliability value $K_2$ and both of the values $\alpha_{LID\_MAG}$, $\alpha_{LID\_ACC}$ calculated, respectively, according to Eq. (1) (i.e., using just the signals of the magnetometers 20, 22) and according to Eq. (4) (i.e., using just the signals of the accelerometers 30, 32).

According to one embodiment, the first fusion block 56 implements a lowpass filter that enables filtering of the noise of the magnetometers 20, 22 and the linear accelerations of the accelerometers 30, 32, said filter being defined by the following expression:

$$\alpha_{LID}(t) \leq K_{LP} \cdot \alpha_{LID\_ACC\_MAG}(t) + (1-K_{LP}) \cdot \alpha_{LID}(t-1)$$
(rad) (6)

where $K_{LP}$ is a coefficient comprised between 0 and 1 (e.g., it is equal to 0.1) and $\alpha_{LID\_ACC\_MAG}(t)\alpha_{LID\_ACC\_MAG}(t)$ is a value thus defined:

if $K_1=0$ and $K_2\neq 0$ (i.e., magnetometers 20, 22 unreliable, and accelerometers 30, 32 reliable), then $$\alpha_{LID\_ACC\_MAG}(t)=\alpha_{LID\_ACC}(t)\alpha_{LID\_ACC\_MAG}(t)$$

if $K_1\neq 0$ and $K_2=0$ (i.e., accelerometers 30, 32 unreliable, and magnetometers 20, 22 reliable), then $$\alpha_{LID\_ACC\_MAG}(t)=\alpha_{LID\_MAG}$$
$$(t)\alpha_{LID\_ACC\_MAG}(t)=\alpha_{LID\_MAG}(t)$$

if $K_1\neq 0$ and $K_2\neq 0$ (i.e., accelerometers 30, 32 and magnetometers 20, 22 reliable), then $$\alpha_{LID\_ACC\_MAG}(t) = \frac{K_1 \cdot \alpha_{LID\_MAG}(t) + K_2 \alpha_{LID\_ACC}(t)}{K_1 + K_2}$$

i.e., the value $\alpha_{LID\_ACC\_MAG}(t)$ is a weighted average of the values $\alpha_{LID\_MAG}(t)$ and $\alpha_{LID\_ACC}(t)$, where the weights are the reliability parameters $K_1$, $K_2$.

Furthermore, if $K_1=0$ and $K_2=0$ (i.e., accelerometers 30, 32, and magnetometers 20, 22 unreliable), the coefficient $K_{LP}$ is set at 0 in such a way that the estimate of the lid angle $\alpha_{LID}(t)$ is not updated, and therefore $\alpha_{LID}(t)=\alpha_{LID}(t-1)$.

Moreover, optionally a further calibration block, of a type in itself known, analogous to the calibration block 49 and not illustrated, receives at input the components $Ax_3(t)$, $Ay_3(t)$, $Az_3(t)$, $Ax_4(t)$, $Ay_4(t)$, and $Az_4(t)$, verifies whether said components are calibrated and returns at output calibrated components (said components at output being equal to the components at input if the components at input are calibrated, and being different from the components at input if the components at input are not calibrated).

Figure 8:
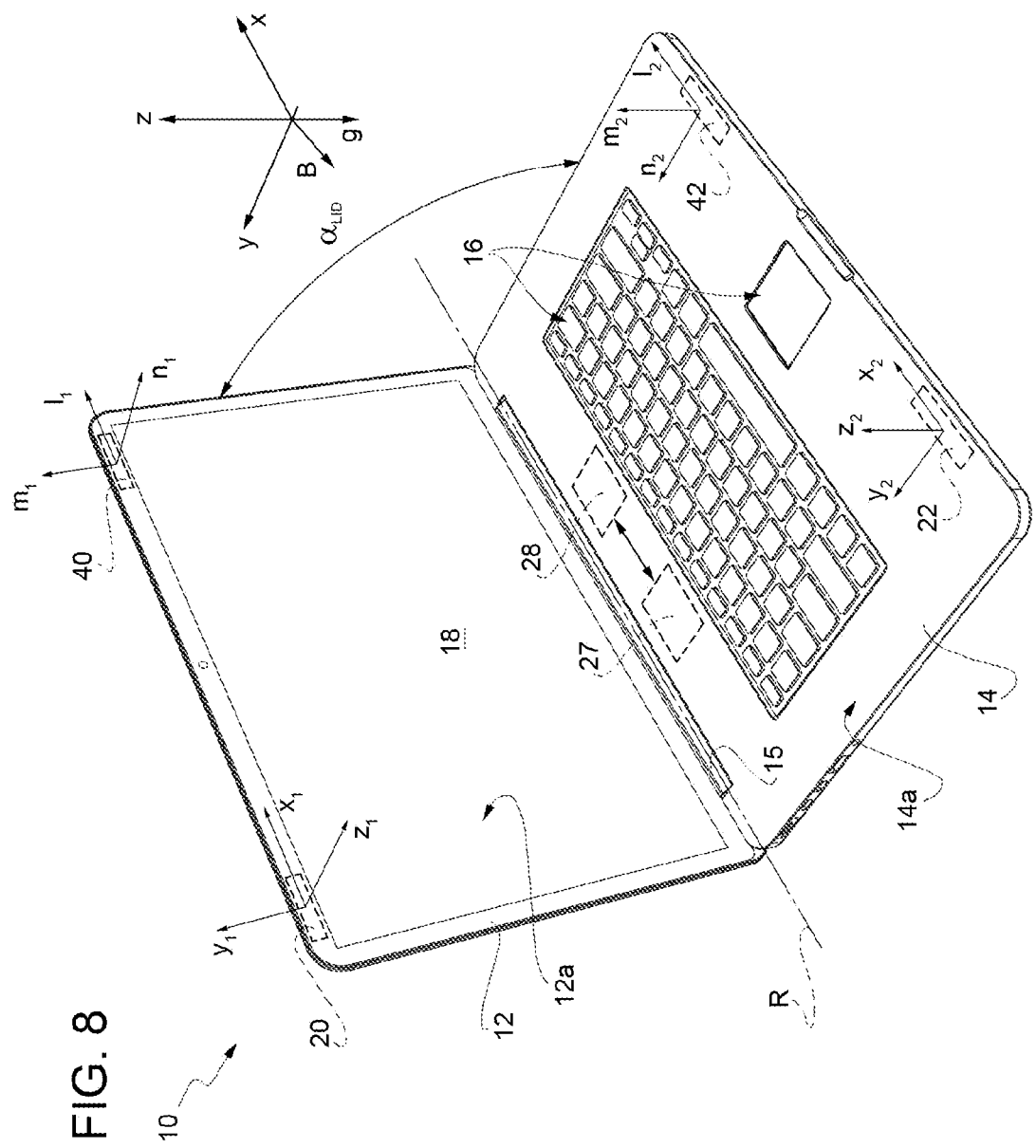
FIG. 8 is a schematic perspective view of a portable device, in particular a notebook, provided with magnetometers and gyroscopes configured for enabling calculation of an opening angle of a screen with respect to a keypad, according to a further embodiment.

According to a different embodiment, illustrated in FIG. 8 and analogous to the one shown in FIG. 2, the lid portion 12 moreover accommodates (e.g., integrates within it) a first gyroscope 40, configured for detecting and/or calculating an orientation and rotation of the lid portion 12 along, and about, sensing axes $l_1$, $m_1$, $n_1$ that are parallel, respectively, to the sensing axes $x_1$, $y_1$, $z_1$ of the first magnetometer 20; and the base portion 14 moreover accommodates (e.g., integrates within it) a second gyroscope 42, configured for detecting and/or calculating an orientation and rotation of the base portion 14 along, and about, sensing axes $l_2$, $m_2$, $n_2$ that are parallel, respectively, to the sensing axes $x_2$, $y_2$, $z_2$ of the second magnetometer 22. It is here pointed out that, in the embodiment here considered, the axis R of the hinge 15 is always parallel to the sensing axes $x_1$, $x_2$, $l_1$, $l_2$ in any operative condition (lid portion 12 closed or open) and for any orientation of the device 10 in the triaxial reference system XYZ. The first and second gyroscopes 40, 42 are operatively coupled to the control unit 27 and/or to the memory 28 and are configured to detect a movement of the portable device 10 by measuring angular velocities. The first and second gyroscopes 40, 42 are, for example, gyroscopes obtained with MEMS technology.

In order to prevent the measurements of the angle $\alpha_{LID}$ from presenting an increasingly lower reliability, the closer they approach the condition of FIG. 4A (axis R parallel to the magnetic field B), as described for the portable device 10 of FIG. 2, in the embodiment of FIG. 8 the measurements obtained from the first and second gyroscopes 40, 42 are fused with the measurements obtained from the first and second magnetometers 20, 22; for example, the measurements obtained from the first and second gyroscopes 40, 42 are more weighted (and, accordingly, the measurements obtained from the first and second magnetometers 20, 22 are less weighted), the more the angle between the axis R and the magnetic field B decreases (i.e., the more closely the condition of FIG. 4A is approached). In this way, the reliability of the measurement of the angle $\alpha_{LID}$ is guaranteed even when the axis R is parallel to the magnetic field B.

The fusion of the measurements of the magnetometers 20, 22 with those of the gyroscopes 40, 42 is not carried out occasionally: as better described hereinafter, according to one aspect of the present disclosure, a complementary filter is used (but it is also possible to use other types of filtering, e.g., Kalman filtering), and the magnetometric component is rejected or attenuated, the more the angle between the axis R and the magnetic field B decreases. The magnetometric component specifically has the function of correcting the drift of the angle calculated by the gyroscopes 40, 42.

The gyroscopic contribution obtained by means of the measurements of the first and second gyroscopes 40, 42 acquired at the current instant t is given by $$\Delta_\alpha = (\omega_{x2} - \omega_{x1}) \cdot dt \text{(rad)} \quad (7)$$

where $w_{x1}$ is the angular velocity measured by the first gyroscope 40 with respect to the sensing axis $l_1$, $\omega_{x2}$ is the angular velocity measured by the second gyroscope 42 with respect to the sensing axis $l_2$. The value dt represents the time that has elapsed between the instant t−1 and the instant t (data-sampling or data-acquisition time of the gyroscopes 40, 42, which in turn may depend upon the updating time of the system, for example comprised between 25 Hz and 200 Hz). For instance, if sampling of the output of the gyroscopes 40, 42 occurs at 100 Hz, the parameter dt is equal to 0.01 s.

Figure 9:
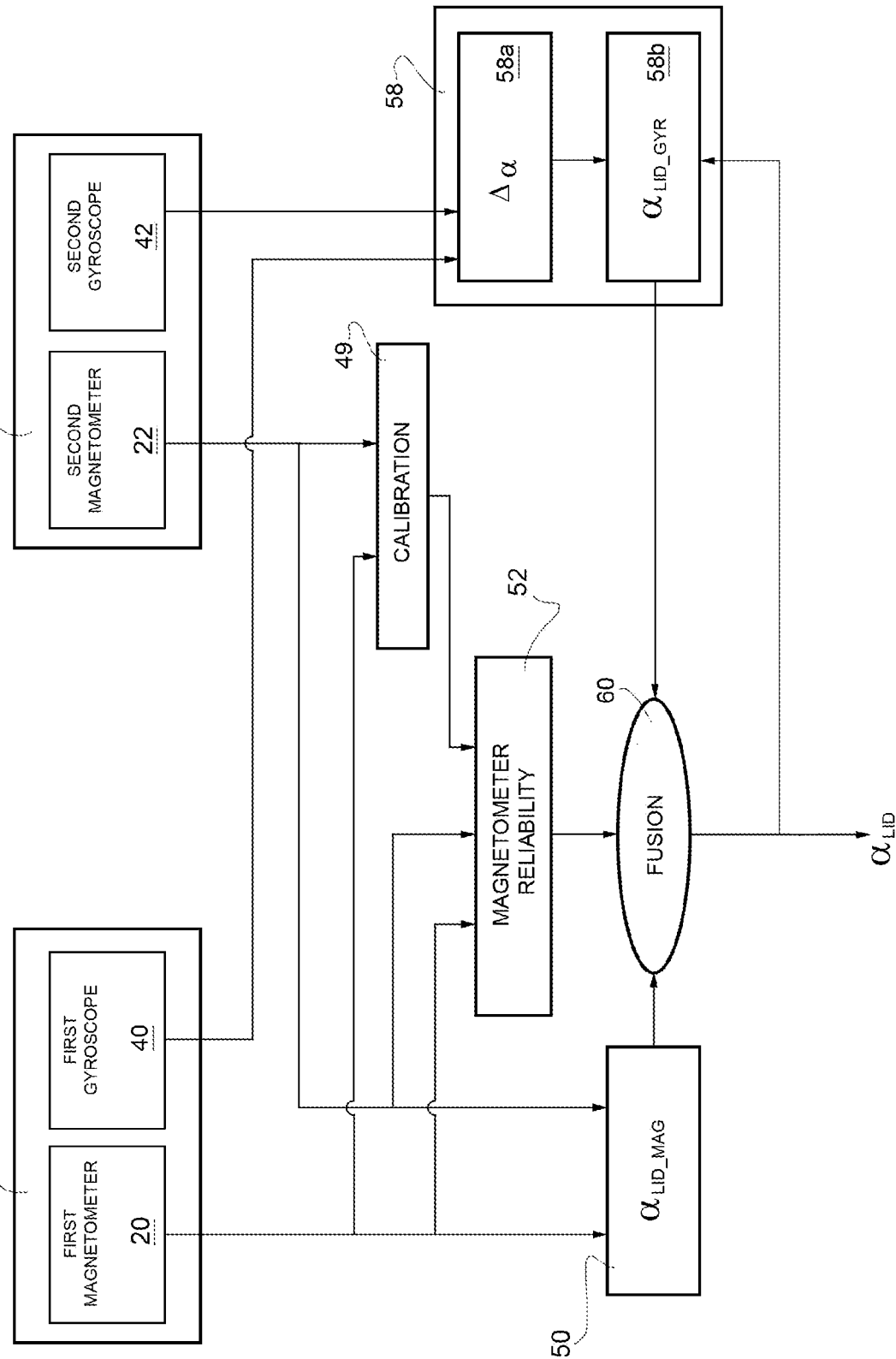
FIG. 9 is a schematic illustration of functional blocks implemented by the portable device of FIG. 8, according to an embodiment of the present disclosure.

According to one aspect of the present disclosure, the control unit 27, with the possible support of the memory 28, is moreover operatively connected to the gyroscopes 40, 42 and is configured for executing the operations illustrated in FIG. 9 and described hereinafter. FIG. 9 is a schematic illustration of functional blocks analogous to the ones represented in FIG. 5.

In particular, FIG. 9 further comprises a third calculation block 58 configured for receiving at input the values of angular velocity $\omega_{x1}$, $\omega_{x2}$ detected by the first and second gyroscopes 40, 42, and calculating a value $\alpha_{LID\_GYR}$ of the lid angle $\alpha_{LID}$ on the basis of Eq. (8) referred to in what follows.

For this purpose, the third calculation block 58 includes a sub-block 58a configured for calculating (at the instant t) the variation Aa of the value $\alpha_{LID}(t)$ of the lid angle $\alpha_{LID}$ with respect to the value $\alpha_{LID}(t-1)$ previously measured (at the previous instant t−1), according to Eq. (7) provided above.

In addition, the third calculation block 58 includes a further sub-block 58b, configured for receiving the variation value Aa and the last value $\alpha_{LID}(t-1)$ of the lid angle $\alpha_{LID}$ calculated and deemed reliable (e.g., generated at output from a second fusion block 60, described hereinafter), and updating in a recursive way said last value $\alpha_{LID}(t-1)$ of the lid angle $\alpha_{LID}$ using the variation value Aa. The sub-block 58b therefore implements the following expression:

$$\alpha_{LID\_GYR}(t) = \Delta_\alpha + \alpha_{LID}(t-1) \text{(rad)} \quad (8)$$

The second fusion block 60 has the function of generating a final value, deemed reliable, of the lid angle $\alpha_{LID}$ on the basis of the first reliability value $K_1$ calculated by the first reliability block 52. The second fusion block 60 receives at input both of the values $\alpha_{LID\_MAG}(t)$, $\alpha_{LID\_GYR}(t)$ calculated according to Eq. (1) (i.e., using just the signals of the magnetometers 20, 22) and, respectively, according to Eq. (8) (i.e., by updating the value $\alpha_{LID}(t-1)$ with the variation Aa obtained via measurements supplied by the gyroscopes 40, 42).

According to one embodiment, the second fusion block 60 implements a complementary filter between the values $\alpha_{LID\_MAG}(t)$ and $\alpha_{LID\_GYR}(t)$, according to the following expression:

$$\alpha_{LID}(t) = K_1' \cdot \alpha_{LID\_MAG}(t) + (1 - K_1') \cdot ((\omega_{x2} - \omega_{x1}) \cdot dt + \alpha_{LID}(t-1)) \quad (9)$$

where $K_1' = n \, K_1$, with n=1 according to one aspect of the present disclosure or else, according to a different aspect of the present disclosure, $0 < n \le n_{max}$ (e.g., $n_{max} = 0.1$) in order to reduce the noise of the magnetometers 20, 22.

In particular, since the value $\alpha_{LID}(t-1)$ does not exist at the first iteration (t=1), for example $\alpha_{LID}(t)$ is set at a value equal to $\alpha_{LID\_MAG}(t)$ or else at a predefined value (e.g., 0°).

From an examination of the characteristics of the disclosure provided according to the present disclosure the advantages that it affords emerge clearly.

In particular, the operations of calculation of the lid angle $\alpha_{LID}$ between the lid portion 12 and the base portion 14 do not require the calculation of the absolute orientation of the lid portion 12 and of the base portion 14, unlike the prior art where measurements are made of absolute orientation in space of respective functional blocks, with respect to which it is desired to calculate a lid angle.

In particular, the presence of the magnetometers 20, 22 enables reduction of the overall cost of the portable device 10. In addition, the magnetometers 20, 22 are immune from effects due to linear accelerations and drift in time. The magnetometers 20, 22 guarantee a reliable measurement when the portable device 10 is open like a book (i.e., when the axis R is parallel to the acceleration of gravity g).

Furthermore, use of the first reliability value $K_1$, associated, as has been said, to an evaluation of reliability of the measurements obtained via the magnetometers 20, 22, makes the methodology of the present disclosure adaptive as a function of various operative conditions and of the service life of the magnetometers themselves.

Real-time calibration of the magnetometers 20, 22 prevents magnetic interference (block 49e) and magnetic distortion (block 49b) from affecting the measurement of the lid angle $\alpha_{LID}$.

With reference to the embodiment of FIG. 6, the simultaneous measurement made by the magnetometers 20, 22 and the accelerometers 30, 32 makes it possible, in addition to the advantages already listed with reference to FIG. 2, to guarantee, via the accelerometers 30, 32 a reliable measurement even in the case where the axis R is parallel to the magnetic field B, and in the case of magnetic anomalies.

With reference to the embodiment of FIG. 8, the simultaneous measurement made by the magnetometers 20, 22 and the gyroscopes 40, 42 makes it possible, in addition to the advantages already listed with reference to FIG. 2, to guarantee, via the gyroscopes 40, 42, a reliable measurement even in the case where the axis R is parallel to the magnetic field B. The gyroscopes 40, 42 moreover determine an ample bandwidth of the measurement of the lid angle $\alpha_{LID}$. In addition, this embodiment enables reliable measurements both in the case where the portable device 10 is open like a book and, simultaneously, magnetic anomalies are present and in the case where the portable device 10 is open like a book and is simultaneously subjected to shaking (and therefore to linear accelerations). The recursive use of formulae, in a closed-loop system, moreover makes the system as a whole stable, rapid, and with a low computational load required. In fact, the gyroscopes 40, 42 are not sensitive to high-frequency disturbance, as occurs, instead, for the accelerometers, or to magnetic disturbance, as occurs, instead, for the magnetometers; at the same time, the drawbacks associated to the calculation of the lid angle $\alpha_{LID}$ performed only by means of gyroscopes (storage of error and lack of knowledge of the initial lid angle upon switching-on of the portable device 10) are solved thanks to the simultaneous measurement made by the magnetometers 20, 22.

Finally, it is clear that modifications and variations may be made to the disclosure described and illustrated herein, without thereby departing from the scope thereof.

In general, in the context of the present disclosure, the lid angle $\alpha_{LID}$ is the angle between two elements (even separate from one another, i.e., not having the hinge 15) or parts that concur in forming an electronic device or system for display of information (electronic apparatus). Such elements or parts are for example: a keypad and a screen; a dual-screen device; a keypad and a tablet; a keypad and a smartphone; a smartphone and a tablet; two smartphones; two portions of display of a foldable smartphone; two tablets; or any other combination of keypad, tablet, smartphone, and screen.

Furthermore, it should be noted that the magnetometers 20, 22, the accelerometers 30, 32, and the gyroscopes 40, 42 may be implemented in: (i) modules separate from one another; (ii) 6-axes inertial-sensor modules (e.g., a first module integrating the first magnetometer 20 and the first accelerometer 30, and a second module integrating the second magnetometer 22 and the second accelerometer 32); (iii) 9-axes inertial-sensor modules (a first module integrating the first magnetometer 20, the first accelerometer 30, and the first gyroscope 40, and a second module integrating the second magnetometer 22, the second accelerometer 32, and the second gyroscope 42). In this latter case, it is also possible to make a 9-axes measurement for guaranteeing an accurate measurement of the lid angle $\alpha_{LID}$ in any condition of use and external factors of the portable device 10.

In some embodiments, a method for controlling at least one function of an electronic apparatus (10) as a function of a value of a lid angle ($\alpha_{LID}$) between a first hardware element (12; 14) and a second hardware element (14; 12) of said electronic apparatus (10), wherein the first hardware element (12; 14) accommodates a first magnetometer (20; 22) and the second hardware element (14; 12) accommodates a second magnetometer (22; 20) and is orientable with respect to the first hardware element (12; 14), may be summarized as including the steps of: generating, by the first magnetometer (20) and by the second magnetometer (22), first signals ($B_1$, $B_2$) that are measurements of a magnetic field (B) external to the electronic apparatus (10) and are indicative of a relative orientation of the first hardware element with respect to the second hardware element; acquiring, by a processing unit (27, 28) of the electronic apparatus (10), said first signals ($B_1$, $B_2$); generating, by the processing unit (27, 28) and as a function of the first signals ($B_1$, $B_2$), a calibration parameter (J1) indicative of a condition of calibration of the first and second magnetometers (20, 22); generating, by the processing unit (27, 28) and as a function of the first signals ($B_1$, $B_2$), a reliability value ($K_1$) indicative of a condition of reliability of the first signals ($B_1$, $B_2$); calculating (50), by the processing unit (27, 28), a first intermediate value ($\alpha_{LID}$ MAG) of said lid angle ($\alpha_{LID}$) on the basis of the first signals ($B_1$, $B_2$); calculating (53), by the processing unit (27, 28), a current value of said lid angle ($\alpha_{LID}$) on the basis of the calibration parameter (J1), of the reliability value ($K_1$), and of said first intermediate value ($\alpha_{LID}$ MAG) of the lid angle ($\alpha_{LID}$); and controlling said function of the electronic apparatus (10) as a function of the current value of the lid angle ($\alpha_{LID}$).

In some embodiments, the first and second hardware elements (12, 14) are rotatable with respect to one another about a rotation axis (R), the first and second hardware elements (12, 14) have a respective first surface (12a) and a respective second surface (14a) directly faceable one another and defining between them the lid angle ($\alpha$LID), and the first magnetometer (20) is a triaxial magnetometer having a respective first sensing axis (x1), a respective second sensing axis (y1), and a respective third sensing axis (z1), and the second magnetometer (22) is a triaxial magnetometer having a respective first sensing axis (x2), a respective second sensing axis (y2), and a respective third sensing axis (z2), the first sensing axes (x1, x2) being parallel to the rotation axis (R).

In some embodiments, the step of calculating the first intermediate value ($\alpha$LID_MAG) includes executing the operation:

$$\arctan2\left(\frac{Gz_2 \cdot Gy_1 - Gy_2 \cdot Gz_1}{Gz_2 \cdot Gz_1 + Gy_2 \cdot Gy_1}\right) + \pi$$

where $Gy_1$ is a component of the first signal ($B_1$) detected by the first magnetometer (20) along the respective second sensing axis ($y_1$), $Gz_1$ is a component of the first signal ($B_1$) detected by the first magnetometer (20) along the respective third sensing axis ($z_1$), $Gy_2$ is a component of the second signal ($B_2$) detected by the second magnetometer (22) along the respective second sensing axis ($y_2$), and $Gz_2$ is a component of the second signal ($B_2$) detected by the second magnetometer (22) along the respective third sensing axis ($z_2$).

In some embodiments, the step of generating the reliability value ($K_1$) includes: calculating a reliability angle ($\varphi_1$; $\varphi_a$, $\varphi_b$) on the basis of the first signals ($B_1$, $B_2$); and generating the reliability value ($K_1$) on the basis of a comparison between the reliability angle ($\varphi_1$; $\varphi_a$, $\varphi_b$) and a threshold angle.

In some embodiments, the reliability angle ($\varphi_1$) is measured between the rotation axis (R) and the magnetic field (B) external to the electronic apparatus (10), and wherein the step of calculating the reliability angle ($\varphi_1$) includes: calculating a first ($\varphi_a$) intermediate angle on the basis of the first signal ($B_1$) of the first magnetometer (20) by executing the operation:

$$\tan^{-1}\frac{\sqrt{Gy_1^2 + Gz_1^2}}{|Gx_1|}$$

and/or calculating a second ($\varphi_b$) intermediate angle on the basis of the first signal ($B_2$) of the second magnetometer (22) by executing the operation:

$$\tan^{-1}\frac{\sqrt{Gy_2^2 + Gz_2^2}}{|Gx_2|}$$

where $Gx_1$ is a component of the first signal ($B_1$) detected by the first magnetometer (20) along the respective first sensing axis ($x_1$), and $Gx_2$ is a component of the second signal ($B_2$) detected by the second magnetometer (22) along the respective first sensing axis ($x_2$); and generating the reliability angle ($\varphi_1$) on the basis of the first intermediate angle ($\varphi_a$) and/or of the second intermediate angle ($\varphi_b$), wherein: the reliability angle ($\varphi_1$) is equal to the first angle ($\varphi_a$); or the reliability angle ($\varphi_1$) is equal to the second angle ($\varphi_b$); or the reliability angle ($\varphi_1$) is equal to an average of the of the first and second angles ($\varphi_a$, $\varphi_b$); or the reliability angle ($\varphi_1$) is equal to a weighted average of the first and second angles ($\varphi_a$, $\varphi_b$).

In some embodiments, the step of generating the reliability value ($K_1$) includes:
calculating a first reliability angle ($\varphi_a$) on the basis of the first signals ($B_1$, $B_2$) by executing the operation:

$$\tan^{-1} \frac{\sqrt{Gy_1^2 + Gz_1^2}}{|Gx_1|}$$

where $Gx_1$ is a component of the first signal ($B_1$) detected by the first magnetometer (20) along the respective first sensing axis ($x_1$); calculating a second reliability angle ($\varphi_b$) on the basis of the first signals ($B_1$, $B_2$) by executing the operation:

$$\tan^{-1} \frac{\sqrt{Gy_2^2 + Gz_2^2}}{|Gx_2|}$$

where $Gx_2$ is a component of the second signal ($B_2$) detected by the second magnetometer (22) along the respective first sensing axis ($x_2$); and generating the reliability value ($K_1$) on the basis of a first comparison between the first reliability angle ($\varphi_a$) and a threshold angle and on the basis of a second comparison between the second reliability angle NO and said threshold angle.

In some embodiments, the step of generating the calibration parameter ($J_1$) includes: generating (49a) calibrated data ($D_2$) on the basis of the first signals ($B_1$, $B_2$) through calibration parameters ($P_{cal}$); comparing the calibrated data ($D_2$) with respective comparison data, generating a result of said comparison that indicates a need or otherwise to calibrate the first and second magnetometers (20, 22); and if the result of said comparison indicates the need to calibrate the first and second magnetometers, executing the steps of: calibrating (49c) the first and second magnetometers (20, 22) to generate new calibration parameters ($P_{cal}$), assigning (49d) to the calibration parameter ($J_1$) a first value indicating execution of the calibration of the first and second magnetometers (20, 22), and replacing (49c) said calibration parameters ($P_{cal}$) with the new calibration parameters ($P_{cal}$) generated by calibrating the first and second magnetometers (20, 22).

In some embodiments, the step of generating (49) the calibration parameter ($J_1$) further includes: if the result of said comparison does not indicate the need to calibrate the first and second magnetometers, executing the steps of: determining (49e), on the basis of the calibrated data ($D_2$), whether a condition of magnetic interference has been verified at the first and second magnetometers (20, 22); and in the absence of said magnetic interference, assigning (49d) to the calibration parameter ($J_1$) said first value; or in the presence of said magnetic interference, assigning (49f) to the calibration parameter ($J_1$) a second value different from the first value.

In some embodiments, the reliability value ($K_1$) is a function of the calibration parameter ($J_1$), wherein the step of calculating (53) the current value of said lid angle ($\alpha_{LID}$) comprises recursively updating said current value of the lid angle ($\alpha_{LID}$) by executing the operation:

$$\alpha_{LID}(t) = (1-K_1') \cdot \alpha_{LID}(t-1) + K_1' \cdot \alpha_{LID\_MAG}(t)$$

with $K_1' = n \cdot K_1$, where $K_1$ is the reliability value and has a value equal to or greater than 0 and smaller than or equal to 1, n is a coefficient with a value greater than 0 and smaller than or equal to 1, $\alpha_{LID}(t)$ is the current value of the lid angle ($\alpha_{LID}$), $\alpha_{LID}(t-1)$ is a value of the lid angle ($\alpha_{LID}$) at an instant immediately preceding the instant of the current value $\alpha_{LID}(t)$, and $\alpha_{LID\_MAG}(t)$ is the first intermediate value.

In some embodiments, the first hardware element (12; 14) further accommodates a first accelerometer (30; 32), and the second hardware element (14; 12) further accommodates a second accelerometer (32; 30), the control method further comprising the steps of: acquiring, by the processing unit (27, 28) through the first and second accelerometers (30, 32), second signals indicative of measurements of relative orientation of the first and second hardware elements; calculating (55), by the processing unit (27, 28), a second intermediate value ($\alpha_{LID\_ACC}$) of said lid angle ($\alpha_{LID}$) on the basis of the second signals; and calculating (56), by the processing unit (27, 28), said current value of the lid angle ($\alpha_{LID}$) further on the basis of said second intermediate value ($\alpha_{LID\_ACC}$) of the lid angle ($\alpha_{LID}$).

In some embodiments, the method further includes the step of generating (54), by the processing unit (27, 28) and as a function of the second signals, a further reliability value ($K_2$) indicative of a condition of reliability of the second signals.

In some embodiments, the step of calculating (56) the current value of the lid angle ($\alpha_{LID}$) includes executing the operation:

$$K_{LP} \cdot \alpha_{LID\_ACC\_MAG}(t) + (1-K_{LP}) \cdot \alpha_{LID}(t-1)$$

where $\alpha_{LID}(t-1)$ is a value of the angle at an instant immediately preceding the instant of the current value, $K_{LP}$ is a coefficient greater than or equal to 0 and smaller than or equal to 1, and $\alpha_{LID\_ACC\_MAG}(t)$ is a value equal to: the second intermediate value ($\alpha_{LID\_ACC}$), if the reliability value ($K_1$) is equal to 0 and the further reliability value ($K_2$) is other than 0; or the first intermediate value ($\alpha_{LID}$ MAG), if the reliability value ($K_1$) is other than 0 and the further reliability value ($K_2$) is equal to 0; or ($K_1 \cdot \alpha_{LID\_MAG}(t) + K_2 \cdot \alpha_{LID\_ACC}(t))/(K_1+K_2)$ if the reliability value ($K_1$) is other than 0 and the further reliability value ($K_2$) is other than 0, where $\alpha_{LID\_MAG}(t)$ is the first intermediate value, and $\alpha_{LID\_ACC}(t)$ is the second intermediate value, $K_1$ is the reliability value and $K_2$ is the further reliability value, and where $K_{LP}$ is equal to 0 if the reliability value ($K_1$) is equal to 0 and the further reliability value ($K_2$) is equal to 0.

In some embodiments, the first hardware element (12; 14) further accommodates a first gyroscope (40; 42) and the second hardware element (14; 12) further accommodates a second gyroscope (42; 40), the method further comprising the steps of: acquiring, by the processing unit (27, 28) and through the first and second gyroscopes (40, 42), second signals indicative of measurements of relative orientation of the first and second hardware elements; calculating (58), by the processing unit (27, 28), a second intermediate value ($\alpha_{LID\_GYR}$) of said lid angle ($\alpha_{LID}$) on the basis of the second signals; and calculating (60), by the processing unit (27, 28), said current value of the lid angle ($\alpha_{LID}$) further on the basis of said second intermediate value ($\alpha_{LID\_GYR}$) of the lid angle ($\alpha_{LID}$).

In some embodiments, the step of calculating the current value of the lid angle ($\alpha_{LID}$) includes the step of executing a weighted sum of the first intermediate value ($\alpha_{LID\_MAG}$) and of the second intermediate value ($\alpha_{LID\_GYR}$).

In some embodiments, the step of executing the weighted sum includes executing the operation:

$$\alpha_{LID}(t) = K_1' \cdot \alpha_{LID\_MAG}(t) + (1-K_1') \cdot \alpha_{LID\_GYR}(t)$$

with $K_1 = n \cdot K_1$, where $K_1$ is the reliability value and has a value equal to or greater than 0 and smaller than or equal to 1, n is a coefficient with a value greater than 0 and smaller than or equal to 1, $\alpha_{LID}(t)$ is the current value of the angle, $\alpha_{LID\_MAG}(t)$ is the first intermediate value, and $\alpha_{LID\_GYR}(t)$ is the second intermediate value.

In some embodiments, an electronic apparatus (10) may be summarized as including: a first hardware element (12; 14) accommodating a first magnetometer (20; 22); and a second hardware element (14; 12) accommodating a second magnetometer (22; 20), orientable with respect to the first hardware element (12), and defining a lid angle ($\alpha_{LID}$) with said first hardware element (12; 14). The first and second magnetometers (20, 22) are configured for generating first signals ($B_1$, $B_2$) that are measurements of a magnetic field (B) external to the electronic apparatus (10) and are indicative of a relative orientation of the first hardware element with respect to the second hardware element. The electronic apparatus (10) further includes a processing unit (27, 28) configured for executing the operations of: acquiring said first signals ($B_1$, $B_2$); generating, as a function of the first signals ($B_1$, $B_2$), a calibration parameter ($J_1$) indicative of a condition of calibration of the first and second magnetometers (20, 22); generating, as a function of the first signals ($B_1$, $B_2$), a reliability value ($K_1$) indicative of a condition of reliability of the first signals ($B_1$, $B_2$); calculating (50) a first intermediate value ($\alpha_{LID\_MAG}$) of said lid angle ($\alpha_{LID}$) on the basis of the first signals ($B_1$, $B_2$); calculating (53) a current value of said lid angle ($\alpha_{LID}$) on the basis of the calibration parameter ($J_1$), of the reliability value ($K_1$), and of said first intermediate value ($\alpha_{LID}$ MAG) of the lid angle ($\alpha_{LID}$); and controlling said function of the electronic apparatus (10) as a function of the current value of the lid angle ($\alpha_{LID}$).

In some embodiments, the first magnetometer (20) is a triaxial magnetometer having a respective first sensing axis ($x_1$), a respective second sensing axis ($y_1$), and a respective third sensing axis ($z_1$) sensing axis, and the second magnetometer (22) is a triaxial magnetometer having a respective first sensing axis ($x_2$), a respective second sensing axis ($y_2$), and a respective third sensing axis ($z_2$), the first sensing axes ($x_1$, $x_2$) being parallel to one another, and when said magnetic field (B) acts in a direction parallel to a rotation axis (R) about which the first and second hardware elements (12, 14) are rotatable with respect to one another, only the first sensing axes ($x_1$, $x_2$) are subject to the magnetic field (B), and the processing unit (27, 28) is configured for assigning to the reliability value ($K_1$) a predefined value indicative of unreliability of the first signals ($B_1$, $B_2$).

In some embodiments, the first hardware element (12; 14) further accommodates a first accelerometer (30; 32), the second hardware element (14; 12) further accommodates a second accelerometer (32; 30), and the processing unit (27, 28) is further configured for executing the operations of: acquiring, through the first and second accelerometers (30, 32), second signals indicative of measurements of relative orientation of the first and second hardware elements; calculating (55) a second intermediate value ($\alpha_{LID\_ACC}$) of said lid angle ($\alpha_{LID}$) on the basis of the second signals; and calculating (56) said current value of the lid angle ($\alpha_{LID}$) further on the basis of said second intermediate value ($\alpha_{LID\_ACC}$) of the lid angle ($\alpha_{LID}$).

In some embodiments, the first hardware element (12; 14) further accommodates a first gyroscope (40; 42), the second hardware element (14; 12) further accommodates a second gyroscope (42; 40); and the processing unit (27, 28) is further configured for executing the operations of: acquiring, through the first and second gyroscopes (40, 42), second signals indicative of measurements of relative orientation of the first and second hardware elements; calculating (58) a second intermediate value ($\alpha_{LID\_GYR}$) of said lid angle ($\alpha_{LID}$) on the basis of the second signals; and calculating (60) said current value of the lid angle ($\alpha_{LID}$) on the basis of said second intermediate value ($\alpha_{LID\_GYR}$) of the lid angle ($\alpha_{LID}$).

In some embodiments, the first hardware element (12) is provided with a first user-interaction device (18) and the second hardware element (14) is provided with a second user-interaction device (16), and the operation of controlling said function of the electronic apparatus (10) comprises adapting operative features or operation features of the first interaction device (18) and/or of the second interaction device (16) as a function of the current value of the lid angle ($\alpha_{LID}$).

In some embodiments, a software product is provided in which the software product is to be loaded into a processing unit (27, 28) of an electronic apparatus (10) comprising a first hardware element (12; 14) accommodating a first magnetometer (20; 22), and a second hardware element (14; 12) accommodating a second magnetometer (22; 20), orientable with respect to the first hardware element (12), and defining a lid angle ($\alpha_{LID}$) with said first hardware element (12; 14); wherein the first and second magnetometers (20, 22) are configured for generating first signals ($B_1$, $B_2$) that are measurements of a magnetic field (B) external to the electronic apparatus (10) and are indicative of a relative orientation of the first hardware element with respect to the second hardware element, said software product being designed in such a way that, when it is run, the processing unit (27, 28) becomes configured for: acquiring said first signals ($B_1$, $B_2$); generating, as a function of the first signals ($B_1$, $B_2$), a calibration parameter ($J_1$) indicative of a condition of calibration of the first and second magnetometers (20, 22); generating, as a function of the first signals ($B_1$, $B_2$), a reliability value ($K_1$) indicative of a condition of reliability of the first signals ($B_1$, $B_2$); calculating (50) a first intermediate value ($\alpha_{LID\_MAG}$) of said lid angle ($\alpha_{LID}$) on the basis of the first signals ($B_1$, $B_2$); calculating (53) a current value of said lid angle ($\alpha_{LID}$) on the basis of the calibration parameter ($J_1$), of the reliability value ($K_1$), and of said first intermediate value ($\alpha_{LID\_MAG}$) of the lid angle ($\alpha_{LID}$); and controlling said function of the electronic apparatus (10) as a function of the current value of the lid angle ($\alpha_{LID}$).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, by a first magnetometer and a second magnetometer of an electronic apparatus, first signals indicating measurements of a magnetic field, the first magnetometer and the second magnetometer being in a first hardware element and a second hardware element, respectively, of the electronic apparatus;
determining, by a processing unit of the electronic apparatus, a calibration parameter based on the first signals, the calibration parameter indicating a condition of calibration of the first and second magnetometers;
determining, by the processing unit, a reliability value based on the first signals, the reliability value indicating of a condition of reliability of the first signals;
determining, by the processing unit, a first value of a lid angle between the first hardware element and the second hardware element based on the first signals;
determining, by the processing unit, a second value of the lid angle based on the calibration parameter, the reliability value, and the first value of the lid angle; and
controlling, by the processing unit, a function of the electronic apparatus based on the second value of the lid angle.

2. The method according to claim 1, wherein the first and second hardware elements are rotatable around a rotation axis, and the lid angle is between a surface of the first hardware element and a surface of the second hardware element.

3. The method according to claim 2, wherein the determining of the first value includes executing the operation:

$$\arctan2\left(\frac{Gz_2 \cdot Gy_1 - Gy_2 \cdot Gz_1}{Gz_2 \cdot Gz_1 + Gy_2 \cdot Gy_1}\right) + \pi$$

where $Gy_1$ is a component of the first signal generated by the first magnetometer along a first sensing axis of the first magnetometer, $Gz_1$ is a component of the first signal generated by the first magnetometer along a second sensing axis of the first magnetometer, $Gy_2$ is a component of the first signal generated by the second magnetometer along a first sensing axis of the second magnetometer, and $Gz_2$ is a component of the first signal generated by the second magnetometer along a second sensing axis of the second magnetometer.

4. The method according to claim 3, wherein the determining of the reliability value includes:
determining a reliability angle based on the first signals; and
determining the reliability value based on a comparison between the reliability angle and a threshold angle.

5. The method according to claim 4, wherein the reliability angle is measured between the rotation axis and the magnetic field, and the determining of the reliability angle includes:
determining a first intermediate angle based on the first signal of the first magnetometer by executing the operation:

$$\tan^{-1}\frac{\sqrt{Gy_1^2 + Gz_1^2}}{|Gx_1|}$$

or determining a second intermediate angle based on the first signal of the second magnetometer by executing the operation:

$$\tan^{-1}\frac{\sqrt{Gy_2^2 + Gz_2^2}}{|Gx_2|}$$

where $Gx_1$ is a component of the first signal generated by the first magnetometer along a third sensing axis of the first magnetometer, and $Gx_2$ is a component of the first signal generated by the second magnetometer along a third sensing axis of the second magnetometer; and
determining the reliability angle based on the first intermediate angle or the second intermediate angle.

6. The method according to claim 3, wherein the determining the reliability value includes:
determining a first reliability angle based on the first signals by executing the operation:

$$\tan^{-1}\frac{\sqrt{Gy_1^2 + Gz_1^2}}{|Gx_1|}$$

where $Gx_1$ is a component of the first signal generated by the first magnetometer along a third sensing axis of the first magnetometer;
determining a second reliability angle based on the first signals by executing the operation:

$$\tan^{-1}\frac{\sqrt{Gy_2^2 + Gz_2^2}}{|Gx_2|}$$

where $Gx_2$ is a component of the first signal generated by the second magnetometer along a third sensing axis of the second magnetometer; and
determining the reliability value based on a first comparison between the first reliability angle and a threshold angle and based on a second comparison between the second reliability angle and the threshold angle.

7. The method according to claim 1, wherein the determining of the calibration parameter includes:
determining calibrated data based on the first signals; and
comparing the calibrated data with respective comparison data.

8. The method according to claim 1, wherein
the reliability value is a function of the calibration parameter,
the determining of the second value of the lid angle includes recursively updating the second value of the lid angle by executing the operation:

$$\alpha_{LID}(t)=(1-K_1')\cdot\alpha_{LID}(t-1)+K_1'\cdot\alpha_{LID\_MAG}(t)$$

with $K_1'=n \cdot K_1$, where $K_1$ is the reliability value and has a value equal to or greater than 0 and smaller than or equal to 1, n is a coefficient with a value greater than 0 and smaller than or equal to 1, $\alpha_{LID}(t)$ is the second value of the lid angle, $\alpha_{LID}(t-1)$ is a value of the lid angle at an instant immediately preceding the instant of the second value $\alpha_{LID}(t)$, and $\alpha_{LID\_MAG}(t)$ is the first value.

9. The method according to claim 1, wherein
the first hardware element includes a first accelerometer, the second hardware element includes a second accelerometer, and the method further includes:
  generating, by the first accelerometer and the second accelerometer, second signals indicating measurements of relative orientation of the first and second hardware elements;
  determining, by the processing unit, a third value of the lid angle based on the second signals; and
  determining, by the processing unit, the second value of the lid angle based on the third value of the lid angle.

10. The method according to claim 9, further comprising:
determining, by the processing unit, another reliability value based on the second signals, the another reliability value indicating a condition of reliability of the second signals.

11. The method according to claim 10, wherein the determining of the second value of the lid angle includes executing the operation:

$$K_{LP} \cdot \alpha_{LID\_ACC\_MAG}(t) + (1 - K_{LP}) \cdot \alpha_{LID}(t-1)$$

where $\alpha_{LID}(t-1)$ is a value of the lid angle at an instant immediately preceding the instant of the second value, $K_{LP}$ is a coefficient greater than or equal to 0 and smaller than or equal to 1, and $\alpha_{LID\_ACC\_MAG}(t)$ is a value equal to:
the third value in a case where the reliability value is equal to 0 and the another reliability value is not equal to 0; or
the first value in a case where the reliability value is not equal to 0 and the another reliability value is equal to 0; or $$(K_1 \cdot \alpha_{LID\_MAG}(t) + K_2 \cdot \alpha_{LID\_ACC}(t))/(K_1 + K_2) \text{ in a case}$$
where the reliability value is *not* equal to 0 and the another reliability value is *not* equal to 0, where $\alpha_{LID\_MAG}(t)$ is the first value, and $\alpha_{LID\_ACC}(t)$ is the third value, $K_1$ is the reliability value and $K_2$ is the another reliability value, and where $K_{LP}$ is equal to 0 if the reliability value is equal to 0 and the another reliability value is equal to 0.

12. The method according to claim 1, wherein
the first hardware element includes a first gyroscope,
the second hardware element includes a second gyroscope, and
the method further includes:
  generating, by the first gyroscope and second gyroscope, second signals indicating measurements of relative orientation of the first and second hardware elements;
  determining, by the processing unit, a third value of the lid angle based on the second signals; and
  determining, by the processing unit, the second value of the lid angle based on the third value of the lid angle.

13. The method according to claim 12, wherein the determining of the second value of the lid angle includes executing a weighted sum of the first value and of the third value.

14. The method according to claim 13, wherein the executing of the weighted sum includes executing the operation:

$$\alpha_{LID}(t) = K_1' \cdot \alpha_{LID\_MAG}(t) + (1 - K_1') \cdot a_{LID\_GYR}(t)$$

with $K_1' = n \cdot K_1$, where $K_1$ is the reliability value and has a value equal to or greater than 0 and smaller than or equal to 1, n is a coefficient with a value greater than 0 and smaller than or equal to 1, $\alpha_{LID}(t)$ is the second value of the angle, $\alpha_{LID\_MAG}(t)$ is the first value, and $\alpha_{LID\_GYR}(t)$ is the third value.

15. A device, comprising:
a first hardware element including a first magnetometer;
a second hardware element including a second magnetometer, the first magnetometer and the second magnetometer configured to generate first signals indicating measurements of a magnetic field; and
a processing unit configured to:
  determine a calibration parameter based on the first signals, the calibration parameter indicating a condition of calibration of the first and second magnetometers;
  determine a reliability value based on the first signals, the reliability value indicating of a condition of reliability of the first signals;
  determine a first value of a lid angle between the first hardware element and the second hardware element based on the first signals;
  determine a second value of the lid angle based on the calibration parameter, the reliability value, and the first value of the lid angle; and
  control a function of the device based on the second value of the lid angle.

16. The device according to claim 15, wherein the first and second hardware elements are rotatable around a rotation axis, and the lid angle is between a surface of the first hardware element and a surface of the second hardware element.

17. The device according to claim 15, wherein
the first hardware element includes a first accelerometer,
the second hardware element includes a second accelerometer,
the first accelerometer and the second accelerometer are configured to generate second signals indicating measurements of relative orientation of the first and second hardware elements
the processing unit is configured to:
  determine a third value of the lid angle based on the second signals; and
  determine the second value of the lid angle based on the third value of the lid angle.

18. The device according to claim 15, wherein
the first hardware element includes a first gyroscope,
the second hardware element includes a second gyroscope,
the first gyroscope and second gyroscope are configured to generate second signals indicating measurements of relative orientation of the first and second hardware elements;
the processing unit is configured to:
  determine a third value of the lid angle based on the second signals; and
  determine the second value of the lid angle based on the third value of the lid angle.

19. A non-transitory computer-readable medium having contents which configure a processing unit of an electronic apparatus to perform a method, the method comprising:
  receiving, from a first magnetometer and a second magnetometer of the electronic apparatus, first signals indicating measurements of a magnetic field, the first magnetometer and the second magnetometer being in a first hardware element and a second hardware element, respectively, of the electronic apparatus;
  determining a calibration parameter based on the first signals, the calibration parameter indicating a condition of calibration of the first and second magnetometers;

determining a reliability value based on the first signals, the reliability value indicating of a condition of reliability of the first signals;

determining a first value of a lid angle between the first hardware element and the second hardware element based on the first signals;

determining a second value of the lid angle based on the calibration parameter, the reliability value, and the first value of the lid angle; and controlling a function of the electronic apparatus based on the second value of the lid angle.

20. The non-transitory computer-readable medium according to claim 19, wherein the first and second hardware elements are rotatable around a rotation axis, and the lid angle is between a surface of the first hardware element and a surface of the second hardware element.

\* \* \* \* \*